United States Patent
Petracca et al.

(10) Patent No.: US 10,409,939 B1
(45) Date of Patent: Sep. 10, 2019

(54) STATISTICAL SENSITIVITY ANALYZER

(71) Applicant: Cadence Design Systems, Inc., San Jose, CA (US)

(72) Inventors: Michele Petracca, Chappaqua, NY (US); Yosinori Watanabe, Lafayette, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 28 days.

(21) Appl. No.: 15/691,363

(22) Filed: Aug. 30, 2017

(51) Int. Cl.
*G06F 17/50* (2006.01)
*G06F 16/2457* (2019.01)

(52) U.S. Cl.
CPC .... *G06F 17/5045* (2013.01); *G06F 16/24578* (2019.01); *G06F 17/5009* (2013.01)

(58) Field of Classification Search
CPC ............. G06F 17/5045; G06F 17/3053; G06F 17/5009; G06F 16/24578; G06F 17/50
See application file for complete search history.

(56) References Cited

U.S. PATENT DOCUMENTS

| | | | | |
|---|---|---|---|---|
| 7,408,551 B1* | 8/2008 | Kazmer | ................. | G06F 17/10 345/440 |
| 2006/0155520 A1* | 7/2006 | O'Neill | ................ | G06Q 10/067 705/348 |
| 2015/0185625 A1* | 7/2015 | Chen | ................... | G03F 7/70633 702/182 |
| 2016/0063149 A1* | 3/2016 | Caunegre | ............ | G06F 17/5036 716/133 |

\* cited by examiner

*Primary Examiner* — Vuthe Siek
(74) *Attorney, Agent, or Firm* — McDermott Will & Emery LLP

(57) ABSTRACT

A method including evaluating a configuration of a device for a selected device parameter and determining a value of the selected device parameter in a first optimal configuration that improves a performance of the device is provided. The method includes determining a sensitivity of the performance of the device relative to the value of the selected device parameter and determining a performance metric that differentiates the first optimal configuration with a second optimal configuration based on the sensitivity of the performance of the device. The method includes ranking the first optimal configuration and the second optimal configuration based on the performance metric and simulating the performance of the device with a second device parameter in one of the first optimal configuration or the second optimal configuration, based on the ranking. A system and a computer readable medium to perform the above method are also provided.

20 Claims, 17 Drawing Sheets

FIG. 4

Impose the feasibility constraint

- ☑ APP_LAT  401-1 — US_FROM_2_0_UPTO_3_0 — ☑ At most — ☐ At least
- ☐ PEAK_BW  401-2 — PERC_FROM_0_UPTO_16 — ☐ At most — ☐ At least
- ☐ QUIETNESS  401-3 — PERC_FROM_40_UPTO_50 — ☐ At most — ☐ At least
- ☐ APP2_LAT_PEAK  401-4 — NS_FROM_190_UPTO_200 — ☐ At most — ☐ At least
- ☐ APP2_LAT_AVG  401-5 — NS_FROM_190_UPTO_200 — ☐ At most — ☐ At least

410

Select the target features of this analysis.

- ☑ FIFO  420-1
- ☑ CPUCLK  420-2

Add and remove scenarios.

☑ GenPeriod  430   US35

☐ At most   ☐ At least

Lock  440   Unlock
Save  445
Delete  437   Add  435

Constraint: (APP_LAT <= US_FROM_2_0_UPTO_3_0) 710
Solution: (FIFO = KB8); (CPUCLK = MHz300) 401-1

| APP2_LAT_AVG 751d | GenPeriod = US20 | GenPeriod = US35 | GenPeriod = US50 | Delete |
|---|---|---|---|---|
| 731d NS_FROM_190_UPTO_200 | 39% | 40% | 40% | |
| 733d NS_FROM_200_UPTO_210 | 14% | 14% | 14% | |
| 735d NS_FROM_210_UPTO_220 | 35% | 33% | 34% | |
| 737d NS_FROM_220_UPTO_230 | 3% | 4% | 4% | |
| 739d NS_FROM_230_UPTO_240 | 3% | 4% | 4% | |
| 741d NS_FROM_240_UPTO_250 | 1% | 0% | 0% | |
| 743d NS_MORE_250 | 1% | 0% | 0% | |

530-1　530-2　630

Solution: (FIFO = KB4); (CPUCLK = MHz500)

| APP2_LAT_AVG 751d | GenPeriod = US20 | GenPeriod = US35 | GenPeriod = US50 | Delete |
|---|---|---|---|---|
| 731d NS_FROM_190_UPTO_200 | 39% | 40% | 40% | |
| 733d NS_FROM_200_UPTO_210 | 8% | 9% | 9% | |
| 735d NS_FROM_210_UPTO_220 | 18% | 16% | 16% | |
| 737d NS_FROM_220_UPTO_230 | 6% | 5% | 5% | |
| 739d NS_FROM_230_UPTO_240 | 9% | 9% | 9% | |
| 741d NS_FROM_240_UPTO_250 | 16% | 18% | 18% | |
| 743d NS_MORE_250 | 1% | 0% | 0% | |

530-1　530-2　630

STATISTICAL SENSITIVITY ANALYZER

TECHNICAL FIELD

Embodiments described herein are generally related to the field of statistical analysis of integrated circuit designs. More specifically, embodiments described herein are related to methods for performing sensitivity analysis of integrated circuit designs including hardware and software.

BACKGROUND

Current integrated circuit (IC) design is largely dedicated to large systems integrating software and hardware to perform multiple tasks simultaneously, or almost simultaneously. Some of these designs include system on a chip (SoC) configurations, typically designed to execute different applications that compete for system resources (e.g., memory, processor time, and bus bandwidth). Due to the large number of operating parameters to consider, system designers typically explore obvious extreme parameter corners that may render inefficient design architectures. Moreover, some combinations of parameter values may be overlooked, resulting in system flaws that may be fatal in certain situations. Also, in some situations it may be desirable for a designer to choose a configuration from two different configurations with seemingly similar performance, that is more beneficial for a certain architecture. In such circumstances, it is desirable to have a tool that systematically and exhaustively explores the parameter space to find the areas where a distinction between two different configurations may be highlighted more clearly.

The description provided in the background section should not be assumed to be prior art merely because it is mentioned in or associated with the background section. The background section may include information that describes one or more aspects of the subject technology.

SUMMARY

In certain aspects, a computer-implemented method for analyzing a device performance is described. The computer-implemented method includes evaluating a configuration of a device for a selected device parameter and determining a value of the selected device parameter in a first optimal configuration of the device that improves a performance of the device. The computer-implemented method also includes determining a sensitivity of the performance of the device relative to the value of the selected device parameter and determining a performance metric that differentiates the first optimal configuration with a second optimal configuration for the device based on the sensitivity of the performance of the device. The computer-implemented method also includes ranking the first optimal configuration and the second optimal configuration of the device based on the performance metric and simulating the performance of the device with a second device parameter in one of the first optimal configuration or the second optimal configuration, based on the ranking.

In certain aspects, a system is described. The system includes a memory storing instructions, and at least one processor that executes the instructions to evaluate a configuration of a device for a selected device parameter and to determine a value of the selected device parameter in a first optimal configuration of the device that improves a performance of the device. The at least one processor further executes instructions to determine a sensitivity of the performance of the device relative to the value of the selected device parameter and to determine a performance metric that differentiates the first optimal configuration with a second optimal configuration for the device based on the sensitivity of the performance of the device. The at least one processor further executes instructions to determine a rank of the first optimal configuration and the second optimal configuration of the device based on the performance metric and to simulate the performance of the device with a second device parameter in one of the first optimal configuration or the second optimal configuration, based on the rank.

In certain aspects, a non-transitory, machine-readable storage medium is described that includes machine-readable instructions for causing a processor to execute a method. The method includes evaluating a configuration of a device for a selected device parameter and determining a value of the selected device parameter in a first optimal configuration of the device that improves a performance of the device. The method also includes determining a sensitivity of the performance of the device relative to the value of the selected device parameter and determining a performance metric that differentiates the first optimal configuration with a second optimal configuration for the device based on the sensitivity of the performance of the device. The method also includes ranking the first optimal configuration and the second optimal configuration of the device based on the performance metric and simulating the performance of the device with a second device parameter in one of the first optimal configuration or the second optimal configuration, based on the ranking.

In certain aspects, a system is described including a means for storing instructions. The system further includes a means to execute the instructions to evaluate a configuration of a device for a selected device parameter and to determine a value of the selected device parameter in a first optimal configuration of the device that improves a performance of the device. The means to execute the instructions further executes instructions to determine a sensitivity of the performance of the device relative to the value of the selected device parameter and to determine a performance metric that differentiates the first optimal configuration with a second optimal configuration for the device based on the sensitivity of the performance of the device. The means to execute the instructions further executes instructions to determine a rank of the first optimal configuration and the second optimal configuration of the device based on the performance metric and to simulate the performance of the device with a second device parameter in one of the first optimal configuration or the second optimal configuration, based on the rank.

BRIEF DESCRIPTION OF THE DRAWINGS

FIG. 4 illustrates a control panel to set constraints in the performance metrics and select design parameters in a statistical sensitivity analysis, according to some embodiments.

FIGS. 7A-D illustrate observe windows with results in a sensitivity analysis for peak bandwidth of a memory usage in an SoC, according to some embodiments.

In the figures, elements and steps denoted by the same or similar reference numerals are associated with the same or similar elements and steps, unless indicated otherwise.

DETAILED DESCRIPTION

Figure 1:
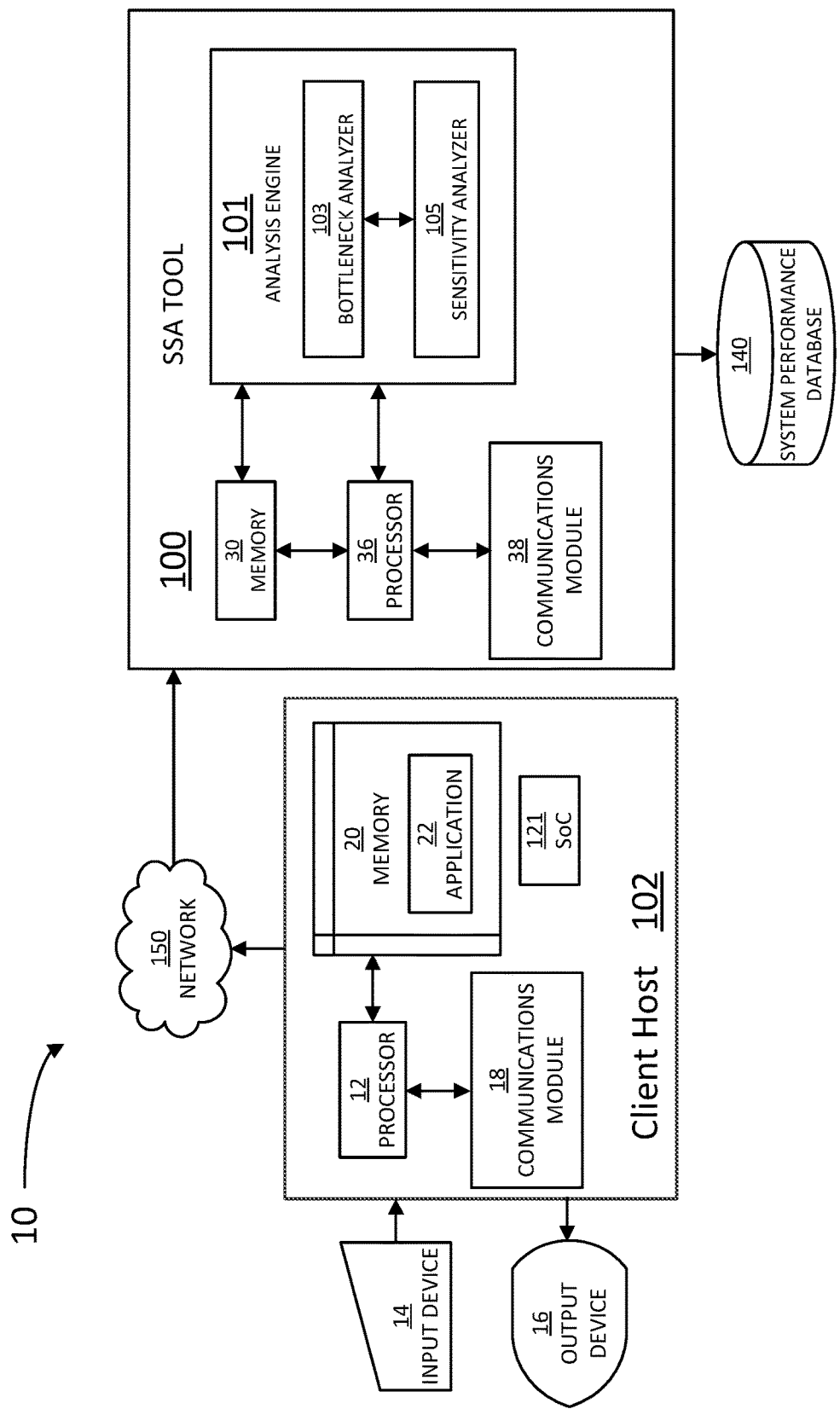
FIG. 1 illustrates a system configured to perform a statistical sensitivity analysis for an SoC, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Embodiments disclosed herein include a statistical system analyzer (SSA) for providing sensitivity analysis of a system architecture (e.g., an SoC) using simulation data obtained with suitably combined parameters. SSA allows a designer to explore areas of a device parameter space to model the system architecture according to a specific environment. The environment may include physical environmental properties such as temperature, or user-related properties such as rate of use (e.g., data traffic, network conditions, and the like), and type of application. SoC designers make use of multiple input blocks including memories, processors, and the like, e.g., "third party intellectual property (IP)." Third party IP may be provided by multiple vendors and have device parameters that can be adjusted by the designer when assembling the multiple devices into an SoC. During assembly, in some embodiments the designer may use an application that configures the parameters for the different IPs to study the performance of the SoC to identify device parameters that may be changed, and how.

In some embodiments, and without limitation, a tool as disclosed herein also includes a software parameter for an SoC, such as logic commands, in addition to hardware properties (e.g., a compiler parameter). Compiler parameters may determine the type of executable program that runs the SoC, which may impact its performance. In some embodiments, a software parameter for an SoC may include a specific algorithm implementation to achieve the same result (e.g., the same type of hardware control or data processing). Further, in some embodiments software parameters may include different constants to, for instance, change the degree of accuracy, the precision, the amount of buffering, or the number of processes or threads in an application. In some embodiments, software parameters for an SoC may involve a tradeoff between speed, power requirements, resource footprint, signal-to-noise ratios, and the like, which the designer may desire to evaluate in detail. Further, software parameters for an SoC in embodiments consistent with the present disclosure may include a selection of whether to run an algorithm on a computer processing unit (CPU), or in a graphics processing unit (GPU). In this regard, the designer may desire to evaluate trade-offs between power requirements, performance, and complexity by selecting between CPU and GPU execution.

In SoC design, three types of properties available to the designer may be distinguished. A first type includes properties that can be directly configured (controllable properties) by the designer. For example, some controllable properties of a system may include the depth of a first-in-first-out (FIFO) buffer, or the clock frequency at which certain circuit component operates, or a bus bandwidth. The designer sets proper values for the controllable properties to optimize the design. A second type includes properties that the designer may desire to monitor during simulation (observable properties). Observable properties may describe the "quality" of the design. One example of an observable property may include the latency of a given operation (e.g., a command execution such as a read/write operation, or a logic operation, or a hardware reconfiguration), or a device bandwidth (e.g., usage of an IP for a selected operation or function). Without limitation, the designer may have no control as to the value of an observable property. Accordingly, the designer may set up quantitative measurements of the observable properties to collect data during simulation. A third type includes properties of the environment (environmental properties) in which the design is expected operate. The designer does not control these properties, (e.g., the use rate of the SoC and the like). In some embodiments, the environmental properties may be included in the SSA tool as test bench parameters to evaluate the performance of a SoC under different conditions.

In some embodiments, SSA tools use a system performance database obtained through a campaign of SoC simulations. Each simulation reports measurements for observable properties under a certain configuration of the design (controllable properties) operating in a certain configuration of the environment (environmental properties). Based on data collected from the measurements and stored in the system performance database, the SSA tool renders a statistical model of the system that highlights the dependency of the "observable" featured from the "environment" and "controllable" ones. The resulting data enables the designer to predict the system performance for different design choices (e.g., after certain assumptions about the environment). Accordingly, the SSA tool provides a profile of design parameters to achieve a desired performance of an SoC, including hardware and software.

Evaluating the design choices for hardware and software and their interactions for a system designer and evaluating Pareto optimality for the allocation of different resources across the SoC. A Pareto optimality defined for a performance metric is a device configuration wherein a change in any device parameter is likely to reduce the performance of the device relative to the selected metric. In some embodiments, the SSA tool optimizes certain property of the design and allows the designer to determine the sensitivity of the design to certain properties: refining the analysis on areas of the parameter space that have more impact on system performance. In some embodiments, an SSA tool may indicate to the designer certain areas of a device parameter space that may be desirable to explore with further SoC simulations.

In some embodiments, an SSA tool as disclosed herein enable the designer to compare multiple Pareto configurations in terms of a new parameter (e.g., power) to break a tie between two or more Pareto configurations.

The disclosed system addresses a technical problem tied to computer technology and arising in the realm of computer simulation of hardware, namely the technical problem of accurately analyzing the performance of an SoC having multiple device and software parameters. The disclosed system solves this technical problem by including a database of simulation results accessible through an application that enables the designer to select, de-select, refine and explore different areas of a device (and software) parameter space, to perform detailed statistical analysis form the selected data, and to request further simulations in refined areas of the device and software parameter space.

FIG. 1 illustrates a system 10 configured to perform a statistical sensitivity analysis for an SoC, according to some embodiments. A client host 102 includes a processor 12 configured to execute instructions stored in a memory 20. Memory 20 may include an application 22, which includes commands that when executed by processor 12 cause client host 102 to perform methods consistent with the present disclosure. Application 22 may include a runtime software program running on client host 102 to issue commands to control an SSA tool 100. For example, application 22 may include an application to control SSA tool 100 for SoC 121. SoC 121 may include an RTL compiler language (e.g., an ASIC RTL file) configured to handle hardware and software that controls the hardware. Client host 102 may also include a communications module 18 that enables client host 102 to transfer data, provide commands and receive instructions from SSA tool 100 through a network 150. Client host 102 may be coupled with an input device 14 (e.g., a mouse, a keyboard, a touch screen display, and the like) and to an output device 16 (e.g., a display, a speaker, and the like). Accordingly, a user of client host 102 may enter commands and queries to client host 102 with input device 14, and receive graphic and other information from client host 102 via output device 16. In some embodiments application 22 may control input device 14 and output device 16 through a graphic user interface (GUI), enabling a user to have access to SSA tool 100 and perform the SSA analysis on SoC 121.

SSA tool 100 may include a memory 30, a processor 36, and a communications module 38 to transfer data, receive commands and provide instructions from client host 102 through network 150. Analysis engine 101 includes a bottleneck analyzer 103, and a sensitivity analyzer 105.

A system performance database 140 stores data results from multiple simulation samples on SoC 121 run with SSA tool 100. In some embodiments, system performance database 140 stores values of environmental properties, controllable properties, and observable properties resulting from multiple simulations of SoC 121.

Figure 2:
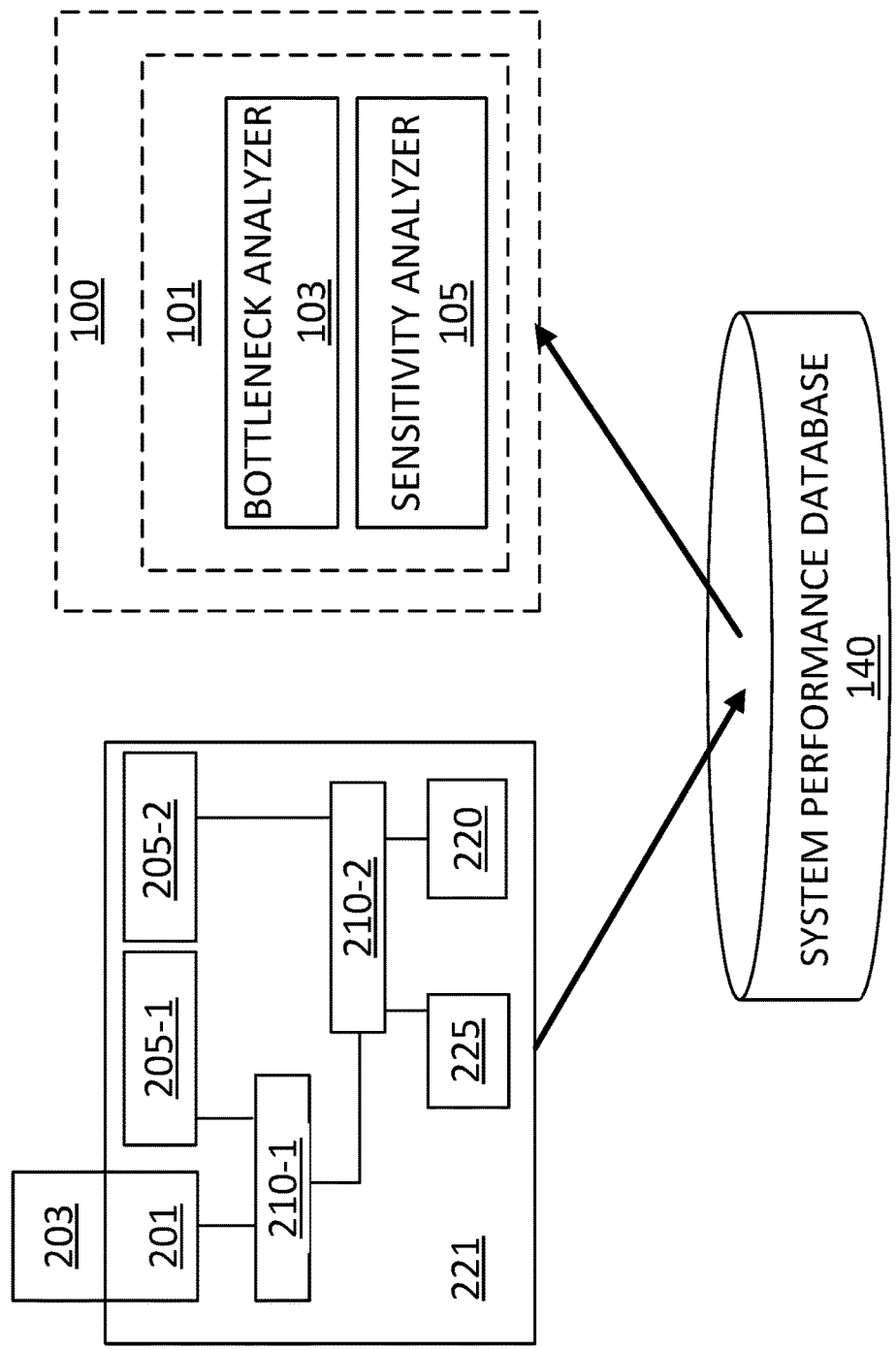
FIG. 2 illustrates a block diagram of a statistical sensitivity analysis of an SoC, according to some embodiments.

FIG. 2 illustrates a block diagram of a statistical sensitivity analysis of SoC 221, according to some embodiments. SoC 221 includes a software 203 to control a computer processing unit (CPU) 201. CPU 201 executes commands from software 203, reads data from, and writes data to, a memory 220 through a first bus 210-1 and a second bus 210-2 (hereinafter, collectively referred to as "buses 210"). CPU 201 may also provide commands to, and exchange data with, a field processing unit (FPU) 225. In addition, SoC 221 may include a first master processor 205-1 and a second master processor 205-2 (hereinafter, collectively referred to as "master processors 205"). As can be seen, CPU 201 and master processors 205 compete for the resources and bandwidth in buses 210, memory 220, and FPU 225.

Bottleneck analyzer 103 and sensitivity analyzer 105 are part of analysis engine 101 in SSA tool 100 as disclosed herein. Bottleneck analyzer 103 and sensitivity analyzer 105 enable the revision of multiple scenarios, or combinations of controllable, environmental, and observable properties. For example, bottleneck analyzer 103 may bring about configurations wherein more than one of CPU 201 or masters 205 attempt to access memory 220, or FPU 225, causing undue latency in the execution of certain operations. Likewise, sensitivity analyzer 105 may bring about configurations (e.g., one or more environmental properties) wherein at least one of the observable properties is characteristically sensitive to changes in one or more controllable properties.

In some embodiments, analysis engine 101 initially performs simulations over a limited sampling of the device (and software) parameter space with selected system configurations. In the simulations, given a system configuration, a random selection of data traffic is provided to SoC 221 and the results of the simulations are stored in system performance database 140. For example, in some embodiments the random selection of data may include sets of video frames formed from random pixel values (e.g., when the SoC is a video-cam controller). In some embodiments, the simulations may include sets of video frames selected at random from other video frames or pictures available to SSA tool 100. The results stored in system performance database 140 may include values of selected observable properties of the SoC. Based on the results, and using machine-learning techniques from prior simulation history stored in system performance database 140, bottleneck analyzer 103 and sensitivity analyzer 105 select additional simulation configurations to provide a refined analysis. Accordingly, bottleneck analyzer 103 and sensitivity analyzer 105 increase the simulation and analysis efficiency by concentrating on areas of the parameter space for controllable and environmental properties that are critical for performance of SoC 221 (e.g., desirable ranges of one or more observable properties).

In some embodiments, analysis engine 101 is configured to determine one or more Pareto points, including ranges of values for controllable properties and environmental properties wherein the performance of SoC 221 is optimal, in terms of at least one observable property (e.g., a metric). Moreover, in some embodiments analysis engine 101 is configured to find a differentiating criterion between two or more competing Pareto points. For example, in some embodiments two Pareto points in different controllable and environmental ranges may provide similar performance of SoC 221 for one or more observable property, and analysis engine 101 may determine a high sensitivity of SoC 221 with respect to a third observable property, which may then be a "tie-breaker" for the two or more competing Pareto points.

SSA tool 100 may also be configured to observe multiple cost metrics to rank feasible solutions for the design of SoC 221, including software 203. In general, SSA tool 100 may be used as a stand-alone tool, in various platforms.

Figure 3:
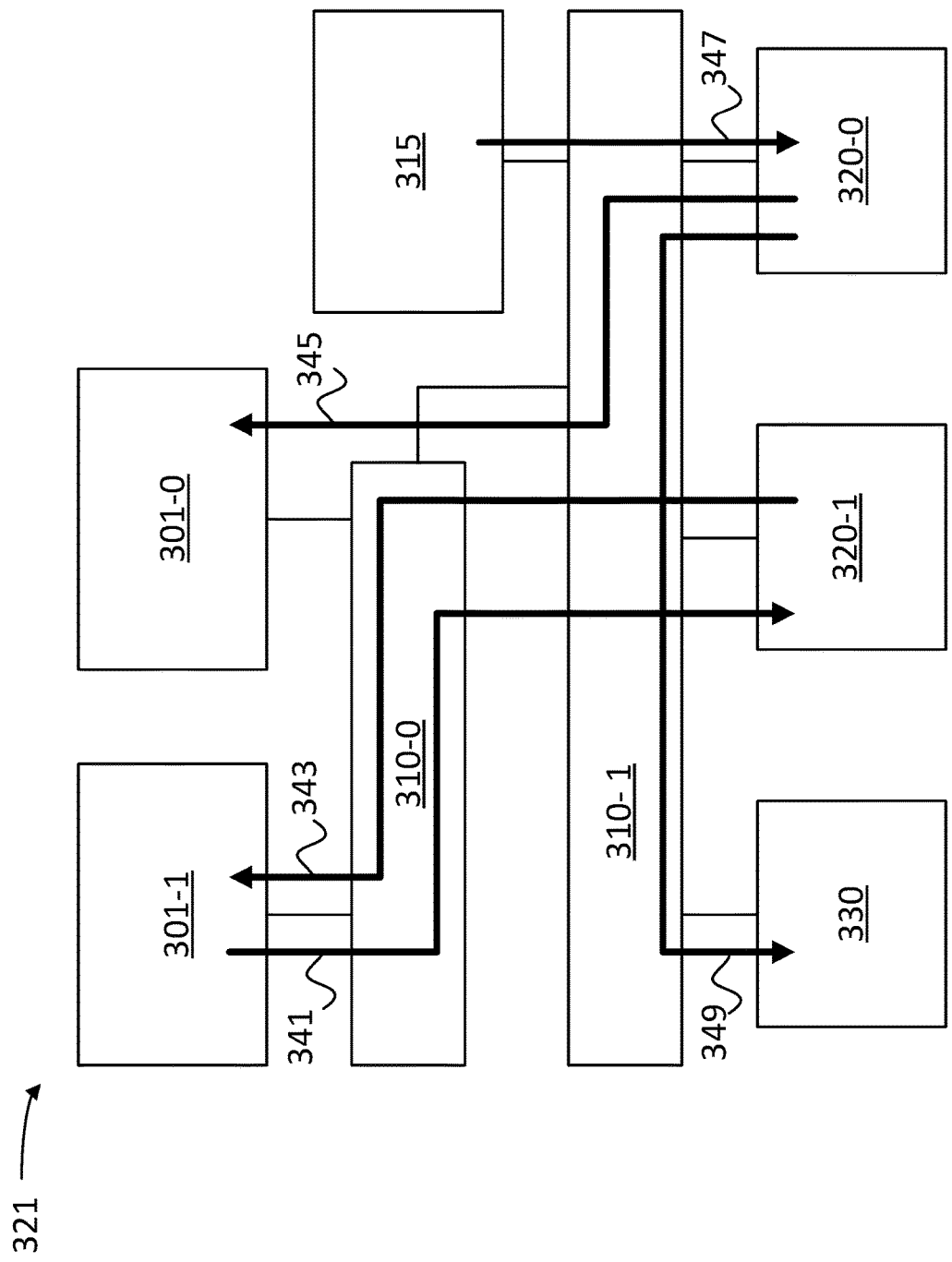
FIG. 3 illustrates an SoC configured to perform operations having a sensitivity for a selected performance parameter, according to some embodiments.

FIG. 3 illustrates an SoC 321 configured to perform operations having a sensitivity for a selected performance parameter, according to some embodiments. Without limitation, SoC 321 includes two computer processing units (CPUs) 301-0 and 301-1 (collectively referred to, hereinafter, as "CPUs 301"), and two memories 320-0 and 320-1 (collectively referred to, hereinafter, as "memories 320"). Memories 320 may include volatile memories such as FIFO buffers, random access memories (RAMs) including dynamic RAMs (DRAMs), static RAMs (SRAMs), and the like. In some embodiments, memories 320 may also include non-volatile memories such as a flash memory, a disk memory (e.g., a hard drive), or any other magnetic device. CPUs 301 are coupled with memories 320 through buses 310-0 and 310-1 (collectively referred to, hereinafter, as "buses 310"). A traffic source 315 injects traffic 347 (e.g., data) to be processed by either of CPUs 301, and a traffic sink 330 removes data 349 form SoC 321 (e.g., to clear memories 320, or to send data 349 to an external memory or other SoC). Without limitation, traffic source 315 injects data 347 into memory 320-0. Thereafter, CPU 301-0 may access a data portion 345 from memory 320-0, to perform a first operation (e.g., run a background function). Likewise, CPU 301-1 may access a data portion 343 from memory 320-0 to perform a second operation (e.g., run a first function independent of the background function).

As a result of the second function, CPU 301-1 may transfer a data 341 to memory 320-1. Traffic sink 330 may periodically clear data 349 from memories 320 so that traffic source 315 may continue to load data 347 into SoC 321.

In some embodiments, SSA tool 100 may include multiple rates at which traffic source 315 injects data 347 to memory 320-0. Without limitation, SSA tool 100 may include three different injection rates for data 347: "High," "Medium," and "Low" For exemplary purposes, and with no limitation a High injection rate may include a period of 20 microseconds (µs) for data injection, a Medium injection rate may include a period of 35 µs for data injection, and a Low injection rate may include a period of 50 µs for data injection. Further, SSA tool 100 may include tiered levels for controllable properties, as follows: A clock speed of CPU 301-1 may be tiered into three levels. For example, in some embodiments the clock speed of CPU may be selected from 200 megahertz (MHz), 300 MHz, and 500 MHz. Likewise, the SSA tool may include three levels for the buffer size of memory 320-0. For example, in some embodiments SSA tool 100 may provide a selection of 2 kilobytes (KB), 4 KB, or 8 KB for the buffer size in memory 320-0. The number of levels associated with the controllable properties of the SoC design may vary according to the desire of the designer and the computational capabilities of the device running SSA tool 100. Moreover, the number of levels may be different for different controllable properties of the SoC (e.g., the buffer size in memory 320-0 may include five levels while the clock speed of CPU 301-1 may include ten levels).

SSA tool 100 may include a latency of the first function in CPU 301-1 as an observable property (or metric). In some embodiments, SSA tool 100 may identify the latency for the first function as the primary constraint. Further, in some embodiments the SSA tool may include the bandwidth of a socket coupled to memory 320-0 in bus 310-1 as a second observable property or metric. Moreover, in some embodiments SSA tool 100 may include the latency of the background function in CPU 301-0 as another observable property.

Accordingly, a SoC designer may use SSA tool 100 to address the frame rate of computation for the first function by SoC 321 under different environmental conditions. The SoC designer may then adjust the different controllable properties to verify the performance of the SoC, which may be focused on the frame rate for executing the first function.

FIG. 4 illustrates a control panel 422 to set constraints 401-1 through 401-5 (hereinafter, collectively referred to as "constraints 401") in the performance metrics and select design properties in a statistical sensitivity analysis, according to some embodiments. Control panel 422 includes a field 410 that lists parameter values and ranges that are a concern (or desirable) for the designer. For example, a constraint 401-1 includes an application latency between 2 to 3 µs, at most. A checkmark indicates the boundary edge of the constrained range for the design property. A peak bandwidth constraint 401-2 may include a percentage between 0% to 16%, at most. A quietness constraint 401-3 may be desirably between 40% to 50%, at least. A peak latency 401-4 for an application (e.g., a background function), or an average latency for the application may be between 190 and 200 ns, at most.

In some embodiments, control panel 422 offers the designer the ability to select target features of the SoC to analyze, such as FIFO depth 420-1 or CPU clock frequency 420-2 (hereinafter, collectively referred to as "target features 420"). Further, control panel 422 may also offer the designer the ability to select or de-select scenarios 430. Accordingly a scenario may be determined by a value or a range of values for an environmental property, such as a traffic injection rate. For example, for an SoC configured to collect and process video frames from a camera, scenarios 430 may include traffic injection as the period of time lapsed between the receipt of each of the video frames (e.g., 20 µs, 35 µs, 50 us and longer). In some embodiments, control panel 422 offers the designer the ability to add or delete new scenarios 430 through an "Add" button 435 and a "Delete" button 437.

As an example, a designer may be interested in the performance of SoC 321 wherein the latency 401-1 of the first function on CPU 301-1 is at most 3 µs: The designer may deselect constraints 401-2 through 401-5. In this configuration all possible values may be considered for the observable properties of the SoC. Further, the designer may select both FIFO length 420-1 (e.g., the buffer depth of memory 320-0) and a CPUCLK 420-2 (e.g., the clock speed of CPU 301-1) as target features to adjust. Control panel 422 may further include a lock button 440 to fix the selected settings (e.g., target features 420) for the simulation, and a save button 445 to store the setting for further use.

Figure 5A:
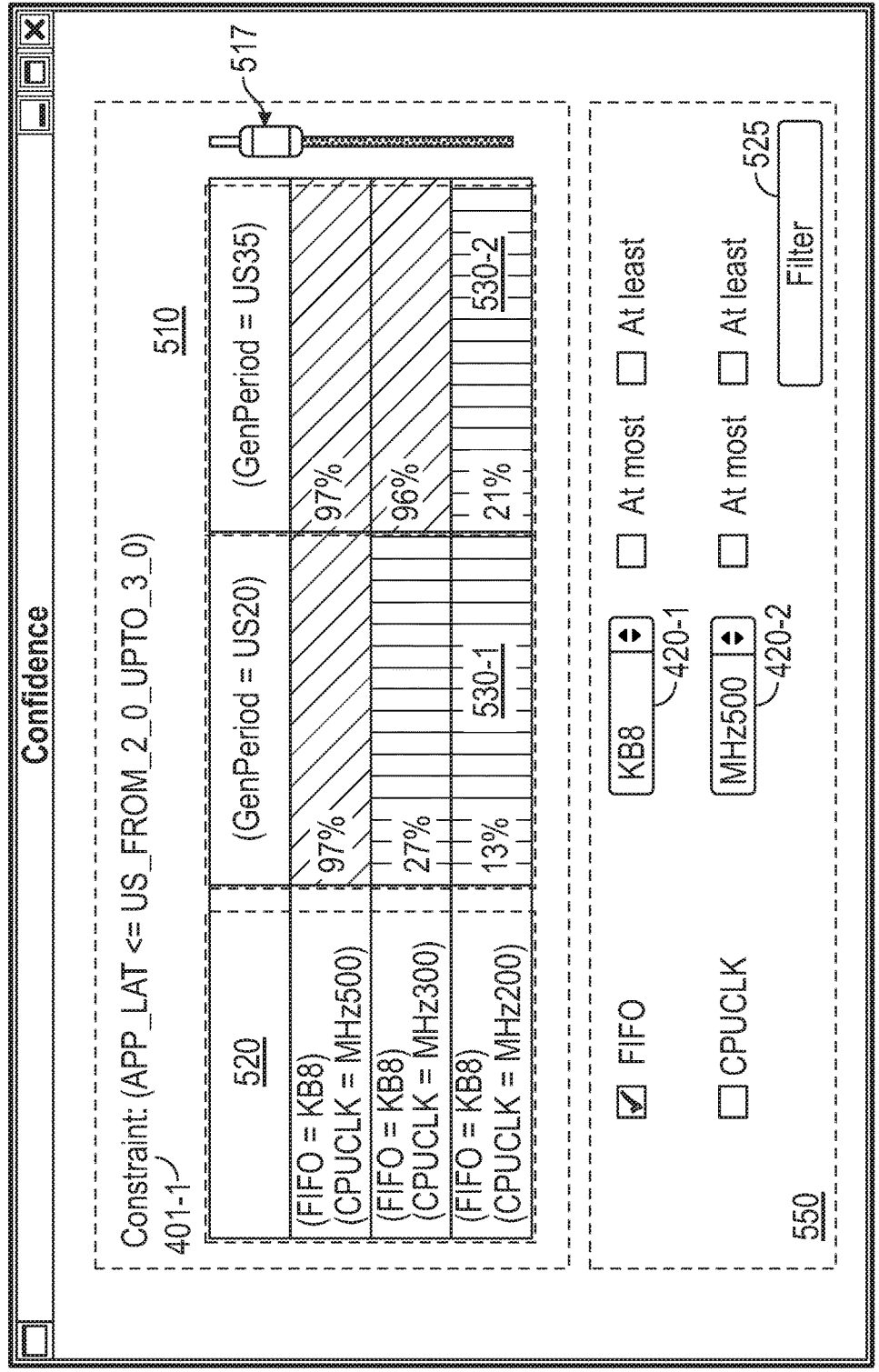
FIGS. 5A-B illustrate confidence windows including distributions of performance values for a selected design parameter in an SoC, according to some embodiments.
Figure 5B:
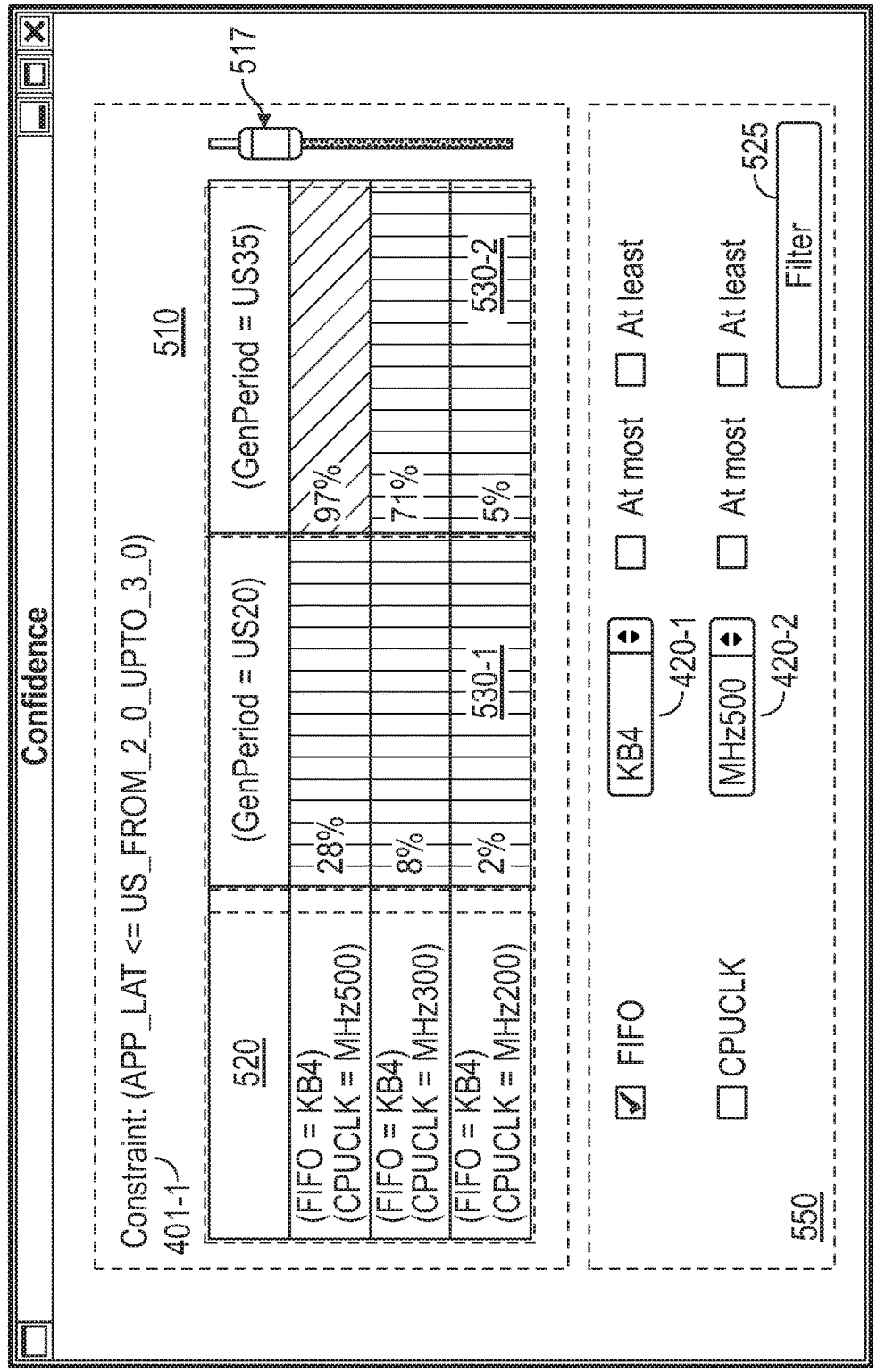

FIGS. 5A-B illustrate confidence windows 522 including distributions of performance values for a selected design parameter in SoC 321, according to some embodiments.

FIG. 5A includes a confidence window 522 showing a field 510 including distributions of values for the selected design parameters in a field 520. For example, in some embodiments the selected design parameter may include a FIFO depth of memory 320-0 may be set to 8 KB (e.g., the longest size for the buffer in memory 320-0). The distributions in field 510 indicate a percentage of simulations conducted under the selected scenario (cf. scenario 430) that meet the performance constraint chosen (e.g. latency 401-1 of the first function in CPU 301-1 less than 2 to 3 µs), for the environmental properties selected 530-1 and 530-2 (hereinafter collectively referred to as "environmental properties 530"). Without limitation, 530-1 and 530-2 have been selected as generation periods of 20 µs and 35 µs, respectively (cf. scenario 430). A filter field 550 allows the designer to select specific values 420-1 and 420-2 for the controllable properties when the designer clicks a "Filter" button 525. With the CPUCLK box in filter field 550 unchecked, field 510 displays the distribution values of all the clock speeds of CPU 301-1 available (e.g., 200 MHz, 300 MHz, and 500 MHz).

For example, in a scenario 530-1 with traffic generation period of 20 µs, the first column in field 510 indicates that 97% of the simulations conducted produce a latency of the first function less than 2 to 3 µs when a CPU 301-1 clock operates at 500 MHz. Under the same scenario, for a CPU 301-1 running a 300 MHz clock, 27% of the simulations produce a latency of the first function less than 2 to 3 µs. And for a CPU 301-1 clock at 200 MHz, only 13% of the simulations produce a latency of the first function less than 2 to 3 µs.

Likewise, in a scenario 530-2 with traffic generation period of 35 µs (e.g., a somewhat more relaxed environment), the first column in field 510 indicates that 97% of the simulations conducted produce a latency of the first function less than 2 to 3 µs when a CPU 301-1 clock operates at 500 MHz. Under the same scenario, for a CPU 301-1 running a 300 MHz clock, 96% of the simulations produce a latency of the first function less than 2 to 3 µs. And for a CPU 301-1 clock at 200 MHz, only 21% of the simulations produce a latency of the first function less than 2 to 3 µs. Confidence window 522 includes a sliding scale 517 that the designer may adjust between minimum and maximum values (e.g., 0% and 100%, respectively), to qualify the values in field 510 as "pass" (e.g., displayed in a slanted hatch) or "fail" (e.g., displayed in vertical hatch). For example, the user may adjust sliding scale 517 to about 90% so that all the values in field 510 above 90% are displayed as "pass" conditions (e.g., in slanted hatch). Accordingly, all values in field 510 below 90% are displayed as "fail" conditions (e.g., in vertical hatch). Sliding scale 517 gives the designer a measure of confidence that certain property values satisfy a desired condition for the SoC.

In summary, SSA tool 100 unambiguously identifies a Pareto point at (BUFFER DEPTH, CPUCLK)=(8 MB, 500 MHz) for scenario 530-1 when the primary performance metric is the latency of the first function.

FIG. 5B includes confidence window 522 with similar characteristics as FIG. 5A, except that in filter field 550, the FIFO depth 420-1 of memory 320-0 is set to a middle level of 4 KB. Likewise to FIG. 5A, the parameter constraint includes latency 401-1 of the first function in CPU 301-1 less than 2 to 3 µs. Also, field 510 includes distributions of values for the design parameters in field 520, selected through filter button 525 in field 550. Further, in scenario 530-1 (e.g., generation period of 20 µs), the first column in field 510 indicates that 28% of the simulations conducted produce a latency of the first function less than 2 to 3 µs when a CPU 301-1 clock operates at 500 MHz. Under the same scenario, for a CPU 301-1 running a 300 MHz clock, 8% of the simulations produce a latency of the first function less than 2 to 3 µs. For a CPU 301-1 clock at 200 MHz, only 2% of the simulations produce a latency of the first function less than 2 to 3 µs.

Likewise, in scenario 530-2 (e.g., generation period of 35 µs), the first column in field 510 indicates that 97% of the simulations conducted produce a latency of the first function less than 2 to 3 µs when a CPU 301-1 clock operates at 500 MHz. Under the same scenario, for a CPU 301-1 running a 300 MHz clock, 71% of the simulations produce a latency of the first function less than 2 to 3 µs. And for a CPU 301-1 clock at 200 MHz, only 5% of the simulations produce a latency of the first function less than 2 to 3 µs.

With the results shown in FIGS. 5A-B, a designer may conclude that for a higher traffic rate of about 20 µs (scenario 530-1), SoC 321 may operate best with a FIFO depth of 8 KB in memory 320-1, and a CPU 301-1 running a clock at 500 MHz. For a medium traffic rate of about 35 µs (scenario 530-2), the designer may conclude that a FIFO depth of 8 KB in memory 320-1, and a CPU 301-1 running a clock at 300 MHz is feasible. For scenario 530-2 (e.g., traffic rate of about 35 µs) the designer may conclude that a FIFO depth of 4 KB in memory 320-1, and a CPU 301-1 running a clock at 500 MHz is also feasible. Accordingly, for a 35 µs traffic condition (scenario 530-2) a designer may find two Pareto points. In such circumstances, the designer may use SSA tool 100 to refine the analysis of SoC 321 for different combination of target features 420 (FIFO depth 420-1, CPUCLK 420-2) and break the performance tie between the configurations (8 KB, 300 MHz) and (4 KB, 500 MHz).

SSA tool 100 provides several choices to the designer: for a traffic rate of 20 µs (scenario 530-1), a FIFO depth 420-1 of 4 KB may be discarded for SoC 321 because the performance fails for any CPUCLK 420-2 (200 MHz, 300 MHz, and 500 MHz). The same holds under CPUCLK 420-2 below 300 MHz when FIFO depth 420-1 is 8 KB. For a traffic rate of 35 µs (scenario 530-2), no further analysis is necessary for a FIFO depth 420-1 of 8 KB and a CPUCLK 420-2 above 300 MHz, because these combinations pass the performance test. Further, in scenario 530-2, when FIFO depth 420-1 is 8 KB, SSA tool 100 may provide a direct solution to find more feasible solutions between 200 MHz (21% compliance=fail) and 300 MHz (96% compliance=pass, cf. FIG. 5A).

Figure 6A:
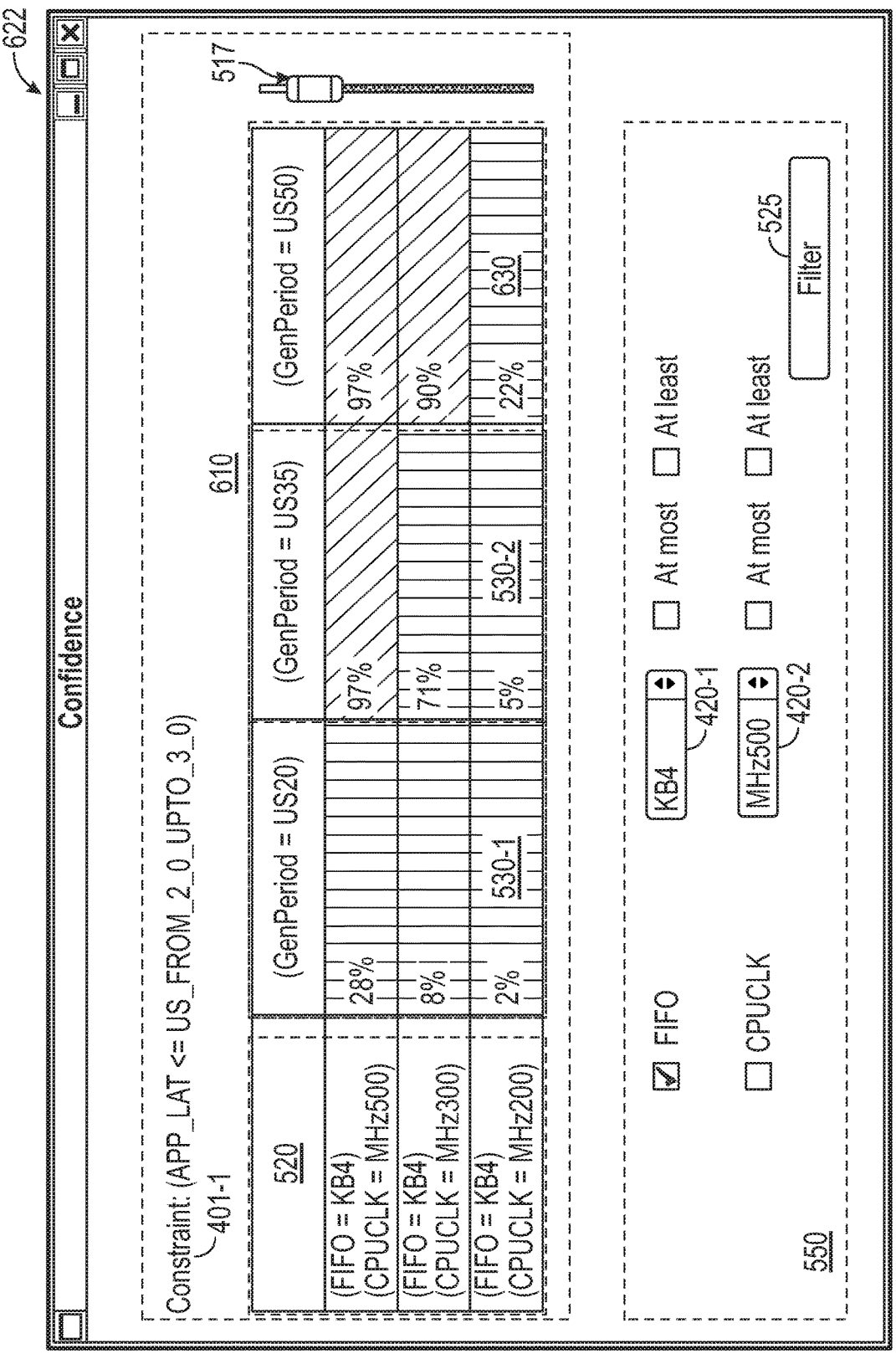
FIGS. 6A-C illustrate confidence windows to compare two Pareto points in the distributions of values for selected design parameter, according to some embodiments.
Figure 6B:
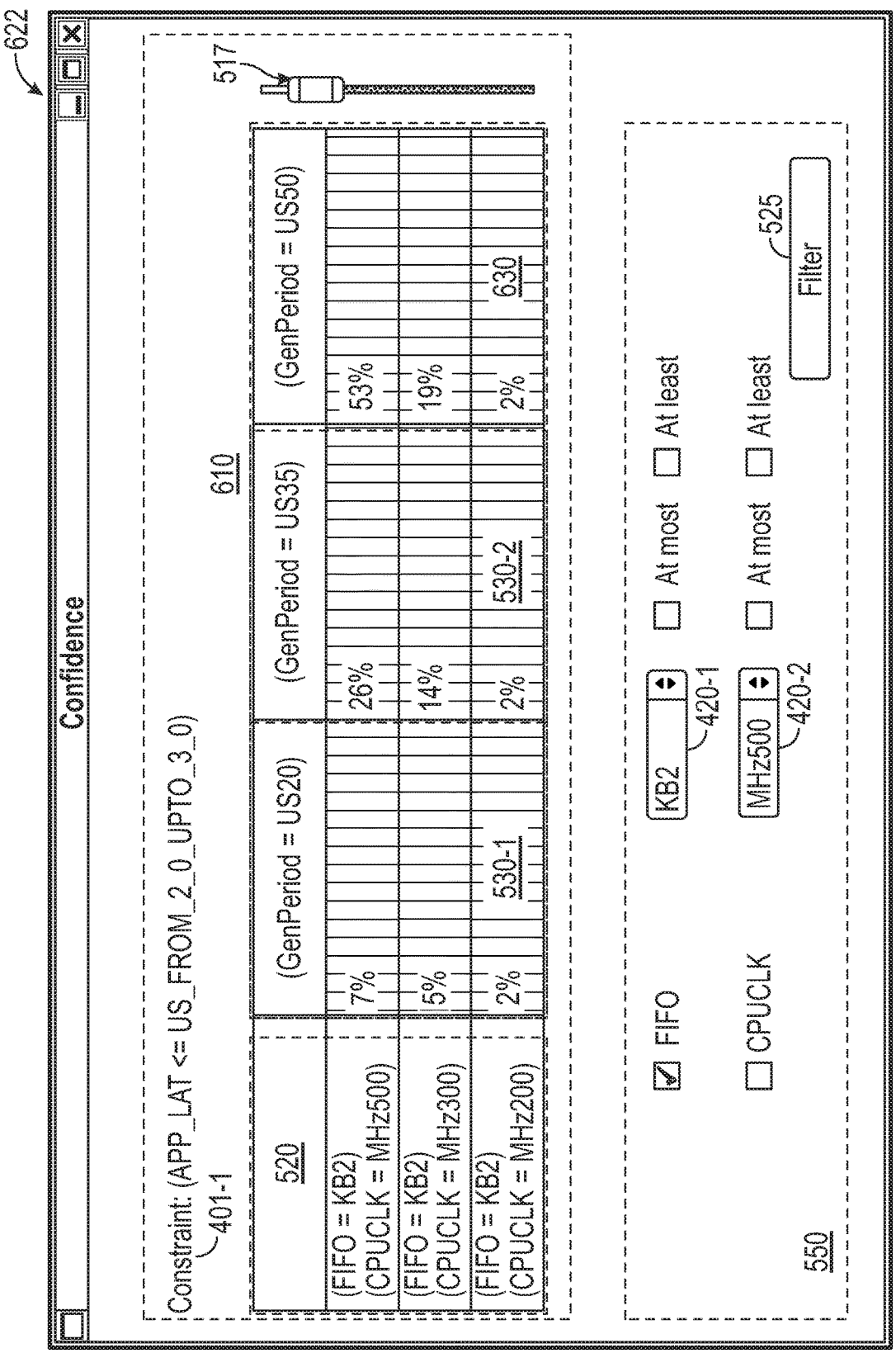
Figure 6C:
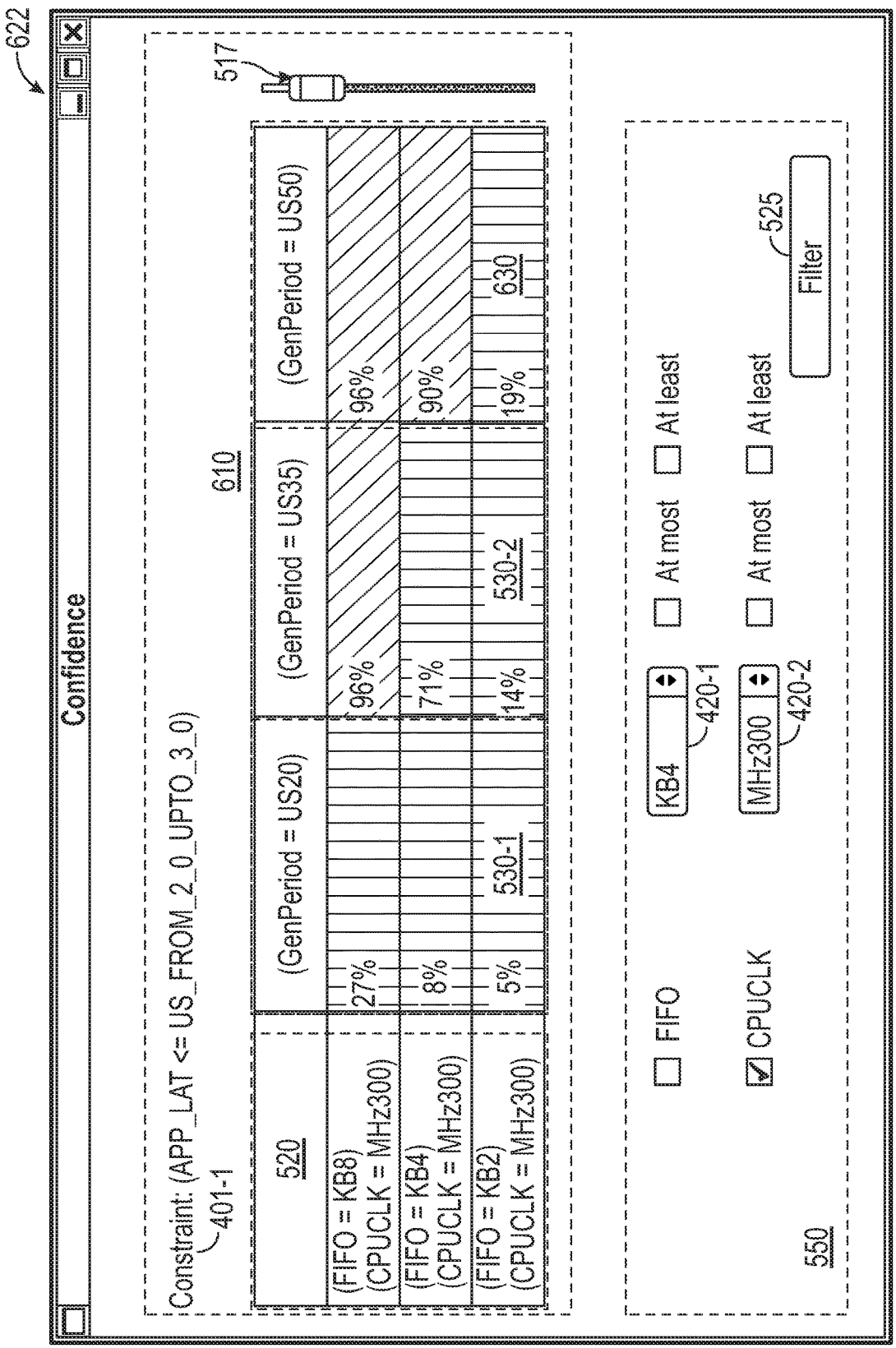

FIGS. 6A-C illustrate confidence windows 622 to compare two Pareto points in the distributions of values for selected design parameter, according to some embodiments. Likewise to FIGS. 5A-B, a parameter constraint includes latency 401-1 of the first function in CPU 301-1 less than 2 to 3 µs. Also, a field 610 includes distributions of values for design parameters 420-1 and 420-2 in field 520 selected through filter button 525 in filter field 550. Sliding scale 517 in confidence windows 622 gives the designer a measure of confidence that certain property values satisfy a desired condition for the SoC. The designer may be interested to find feasible solutions where FIFO size of memory 320-0 is medium (4 KB) and CPU 301-1 clock is 300 MHz. In the embodiments illustrated, in addition to scenarios 530-1 and 530-2, a scenario 630 with slower traffic rate of 50 µs has been included as an environmental parameter to refine the analysis. To do this, the designer adds scenario 630 to scenarios 430 from control panel 422 (e.g., after clicking Add button 435).

FIG. 6A illustrates field 610 including a FIFO depth of 4 KB with CPUCLK 420-2 unchecked in filter 550. In scenario 530-1, with traffic generation period of 20 µs, field 610 indicates that 28% of the simulations conducted produce a latency of the first function less than 2 to 3 µs when a CPU 301-1 clock operates at 500 MHz. Under the same scenario, for a CPU 301-1 running a 300 MHz clock, 8% of the simulations produce a latency of the first function less than 2 to 3 µs. And for a CPU 301-1 clock at 200 MHz, only 2% of the simulations produce a latency of the first function less than 2 to 3 µs.

In a scenario 530-2, with traffic generation period of 35 µs, field 610 indicates that 97% of the simulations conducted produce a latency of the first function less than 2 to 3 µs when a CPU 301-1 clock operates at 500 MHz. Under the same scenario, for a CPU 301-1 running a 300 MHz clock, 71% of the simulations produce a latency of the first function less than 2 to 3 µs. And for a CPU 301-1 clock at 200 MHz, only 5% of the simulations produce a latency of the first function less than 2 to 3 µs. And in a scenario 630 with traffic generation period of 50 µs, field 610 indicates that 97% of the simulations conducted produce a latency of the first function less than 2 to 3 µs when a CPU 301-1 clock operates at 500 MHz. Under the same scenario, for a CPU 301-1 running a 300 MHz clock, 90% of the simulations produce a latency of the first function less than 2 to 3 µs. And for a CPU 301-1 clock at 200 MHz, 22% of the simulations produce a latency of the first function less than 2 to 3 μs.

FIG. 6B illustrates field 610 including a FIFO depth of 2 KB with CPUCLK 420-2 unchecked in filter 550. In scenario 530-1, field 610 indicates that 7% of the simulations conducted produce a latency of the first function less than 2 to 3 μs when a CPU 301-1 clock operates at 500 MHz. Under the same scenario, for a CPU 301-1 running a 300 MHz clock, 5% of the simulations produce a latency of the first function less than 2 to 3 μs. And for a CPU 301-1 clock at 200 MHz, only 2% of the simulations produce a latency of the first function less than 2 to 3 μs.

In scenario 530-2, field 610 indicates that 26% of the simulations conducted produce a latency of the first function less than 2 to 3 μs when a CPU 301-1 clock operates at 500 MHz. Under the same scenario, for a CPU 301-1 running a 300 MHz clock, 14% of the simulations produce a latency of the first function less than 2 to 3 μs. And for a CPU 301-1 clock at 200 MHz, only 2% of the simulations produce a latency of the first function less than 2 to 3 μs. And in scenario 630, field 610 indicates that 53% of the simulations conducted produce a latency of the first function less than 2 to 3 μs when a CPU 301-1 clock operates at 500 MHz. Under scenario 630, for a CPU 301-1 running a 300 MHz clock, 19% of the simulations produce a latency of the first function less than 2 to 3 μs. And for a CPU 301-1 clock at 200 MHz, 2% of the simulations produce a latency of the first function less than 2 to 3 μs.

In view of the above results, a designer may note that, in a scenario with a slow traffic rate of 50 μs, and operating at a CPUCLK=300 MHz, the probability to satisfy a latency of the first function less than 2 to 3 μs has changed dramatically from 90% to 19%, by reducing FIFO depth from 4 KB to 2 KB. Accordingly, the performance of SoC 321 in terms of first function latency is highly sensitive to the FIFO size in the above environment.

FIG. 6C includes a further results from SSA tool 100, wherein the designer has unchecked FIFO depth tab 420-1 and has selected tab 420-2 for a CPUCLK speed of 300 MHz, in filter 550. Field 610 indicates that, in scenario 630, for a FIFO depth of 8 KB, 96% of the simulations satisfy latency constraint 401-1. For a FIFO depth of 4 KB, 90% of the simulations satisfy latency constraint 401-1. However, the probability of SoC 321 to satisfy latency constraint 401-1 is reduced to 19% for a FIFO depth of 2 KB. Accordingly, the latency performance sensitivity of SoC 321 to FIFO depth is high when the FIFO depth changes between 2 KB and 4 KB. However, the latency performance sensitivity is lower for a FIFO depth between 4 KB (90%) and 8 KB (96%).

Accordingly, in scenario 630, (FIFO, CPUCLK)=(4 KB, 300 MHz) is a Pareto point, and a refined analysis may be avoided for FIFO depths higher than 4 KB and CPUCLK higher than 300 MHz. In scenario 630, when CPUCLK=300 MHz, there may be more feasible solutions when FIFO depth is smaller than 4 KB. In scenario 630, the performance sensitivity of SoC 321 to buffer depth is high. For example, the impact of buffer depth to the first function latency may be large.

FIGS. 7A-D illustrate observe windows 722 with results in a sensitivity analysis for an additional performance metric, according to some embodiments. In some embodiments the performance metric may be defined by a parameter constraint including latency 401-1 of the first function in CPU 301-1 less than 2 to 3 μs. In some embodiments, the additional performance metric is a peak bandwidth usage 711 of memory 320-0. A field 710 illustrates the analysis results with the additional performance metric for different scenarios 430 (e.g., scenario 530-1, scenario 530-2, and scenario 630). In some embodiments, including the peak bandwidth of memory usage in field 710 may help a designer to break the tie (e.g., in scenario 530-2), between the two Pareto points identified with (FIFO, CPUCLK)=(8 KB, 300 MHz) and (4 KB, 500 MHz). The difference between the two Pareto points in terms of peak bandwidth usage of memory 320-0 may be a tie breaking criterion.

To obtain the results in field 710, SSA tool 100 searches in system performance database 140 the number of clock cycles of memory 320-0 used for transactions of CPU 301-1 (e.g., to implement first function) in each of a successive sequence of time windows, for a selected period of time. SSA tool 100 determines a maximum of this number each time CPU 301-1 executes the first function (in percent, relative to the total number of clock cycles of memory 320-0 during the selected period of time in the simulation). For a given first function latency, it may be desirable that the peak bandwidth usage of memory 320-0 be kept low, because the remaining clock cycles could be used by memory 320-0 to handle transactions other than those from CPU 301-1 (or transactions from CPU 301-1 other than the first function). Field 710 shows how this maximum number is distributed in the executions of the first function for the three scenarios 430. A sliding scale 717 may be adjusted according to a performance of SoC 321 with respect to the additional performance metric.

Figure 7A:
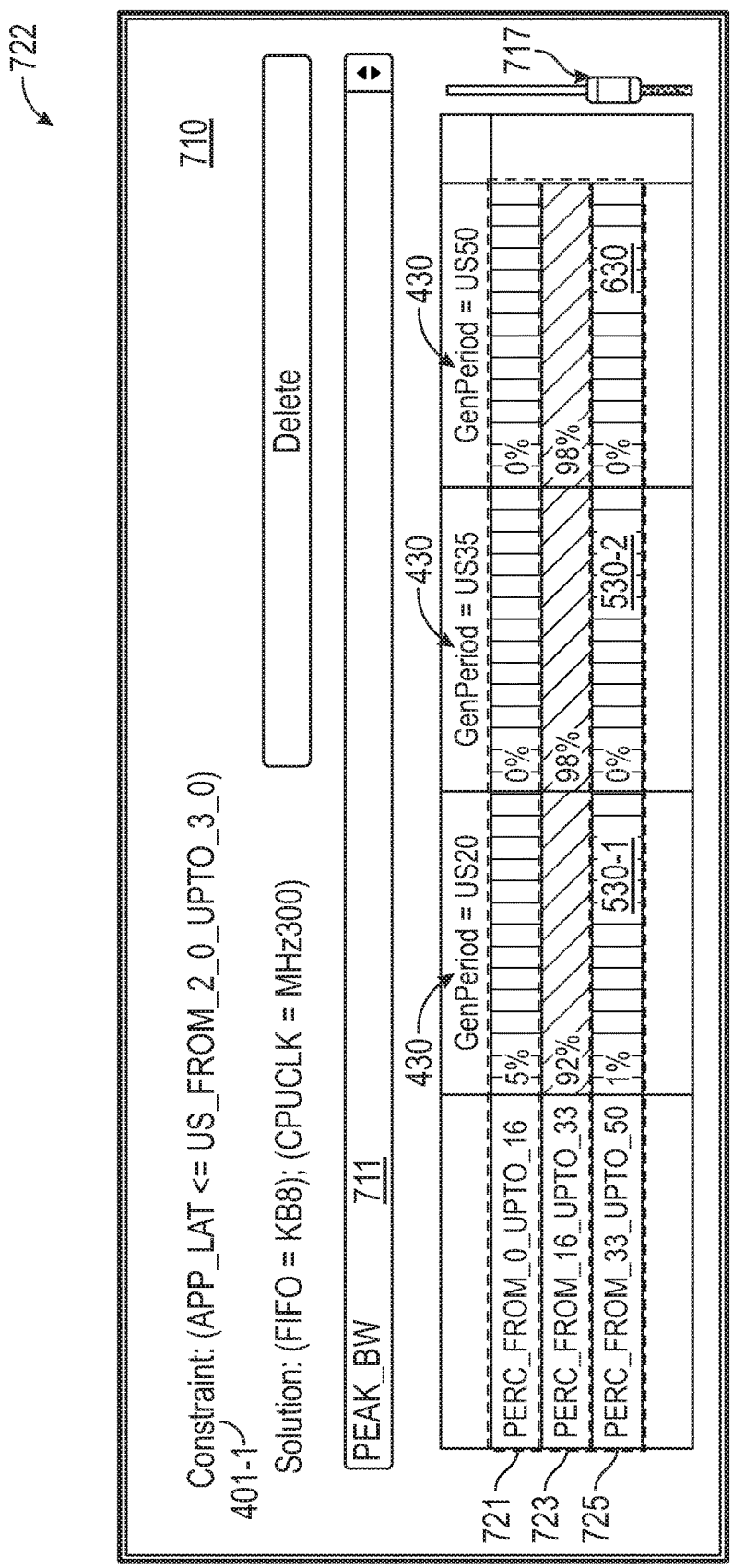
Figure 7B:
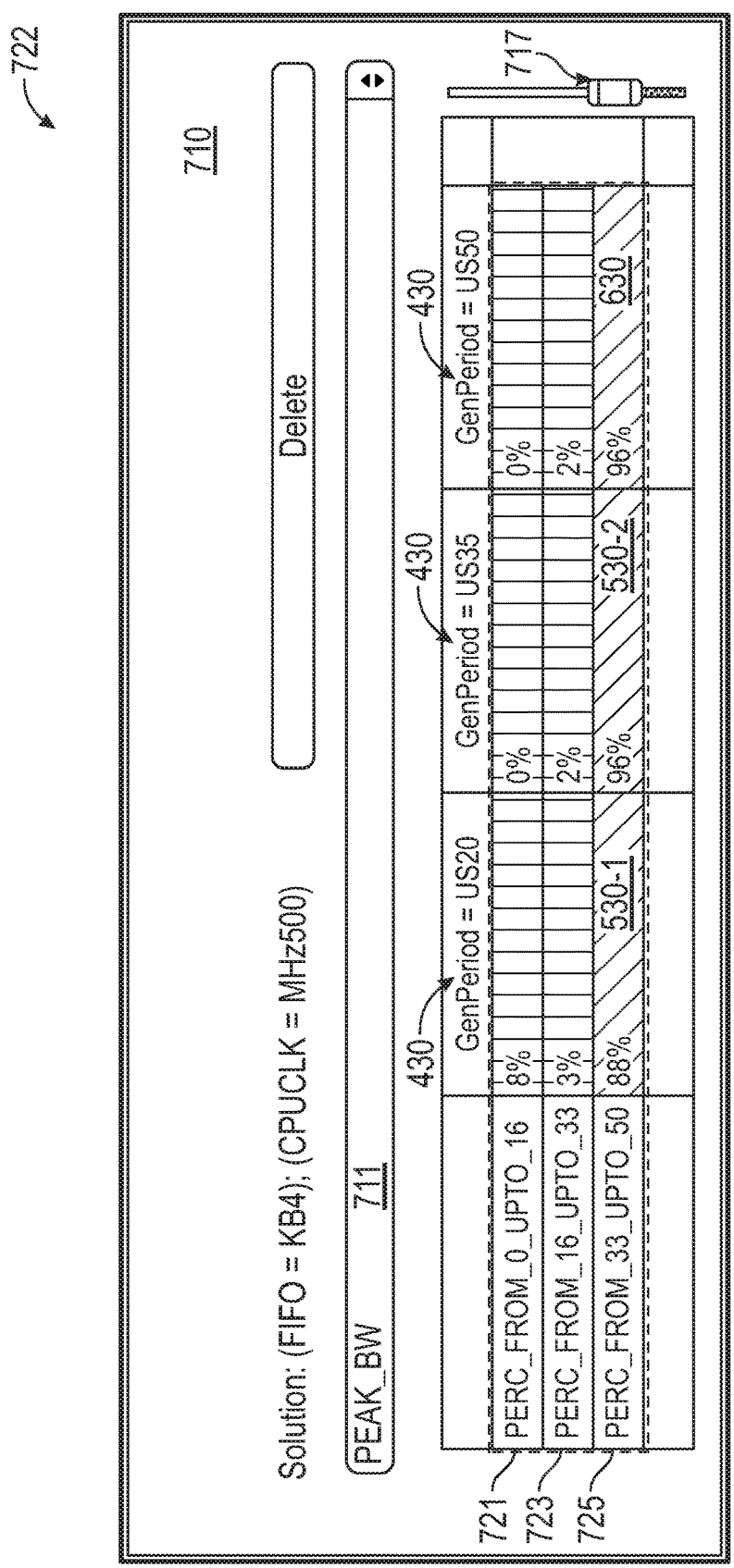

Accordingly, and without limitation, FIGS. 7A-B list three tiers of peak bandwidth usage 711. Tier 721 indicates a range between 0% to 16% percent of peak bandwidth usage 711. Tier 723 indicates a range between 16% to 33% percent of peak bandwidth usage 711. Tier 725 indicates a range between 33% to 50% percent of peak bandwidth usage 711.

FIG. 7A illustrates the results in field 710 for the first Pareto point (8 KB, 300 MHz) in all three scenarios 430 (e.g., scenario 530-1, scenario 530-2, and scenario 630). Field 710 shows that the majority of the simulations tend to tier 723 (slanted hatch background) of peak memory usage. Accordingly, in scenario 530-1, 92% of the execution of the first function occupies 16%-33% of the clock cycles in memory 320-0. In scenario 530-2, 98% of the execution of the first function occupies 16%-33% of the clock cycles in memory 320-0. In scenario 630, 98% of the execution of the first function occupies 16%-33% of the clock cycles in memory 320-0.

FIG. 7B illustrates the results in field 710 for the second Pareto point (4 KB, 500 MHz) in all three scenarios 430 (e.g., scenario 530-1, scenario 530-2, and scenario 630). Field 710 shows that the majority of the simulations tend to tier 725 (slanted hatch background) of peak memory usage, leaving less availability to serve transactions for the other CPU, this tendency does not change much in the different scenarios 530. Accordingly, for the second Pareto point in scenario 530-1, 88% of the execution of the first function occupies 33%-50% of the clock cycles in memory 320-0. In scenario 530-2, 96% of the execution of the first function occupies 33%-50% of the clock cycles in memory 320-0. And in scenario 630, 96% of the execution of the first function occupies 33%-50% of the clock cycles in memory 320-0.

Figure 7C:
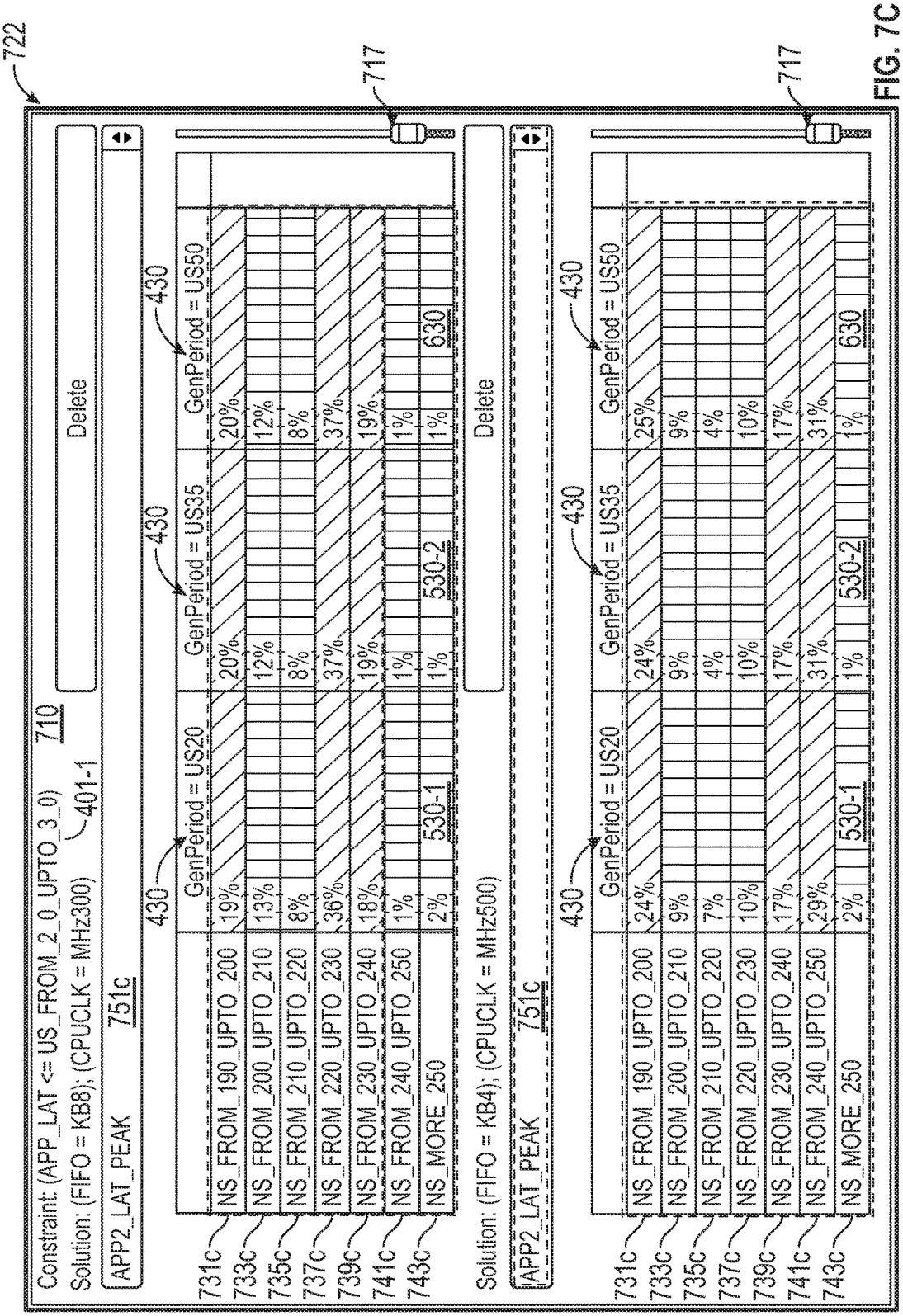

To further enable a designer to make a choice between the two Pareto points, FIGS. 7C-D list seven tiers of additional performance metrics. In some embodiments, the additional performance metrics are, without limitation, a peak latency 751c (cf. FIG. 7C) and an average latency 751d (cf. FIG. 7D) for the performance of the background application (e.g., by CPU 301-2).

To obtain the results in FIGS. 7C-D, SSA tool 100 searches in system performance database 140 for the execution time stamps of the background function, and determines the latency for each execution. SSA tool 100 determines a peak 751c of the background function latency over a period when one iteration of the first function was executed in CPU 301-1. Likewise, and using the same statistical sample, SSA tool 100 determines an average 751d of the background function latency. FIG. 7C shows how peak latency 751c distributes, and FIG. 7D shows how peak latency 751d distributes, in the simulations for the two Pareto points.

FIG. 7C Lists seven tiers of peak latency 751c for the background application. Tier 731c indicates a peak latency 751c (in nanoseconds, ns) between 190 ns and 200 ns. Tier 733c indicates a peak latency 751c between 200 ns and 210 ns. Tier 735c indicates a peak latency 751c between 210 ns and 220 ns. Tier 737c indicates a peak latency 751c between 220 ns and 230 ns. Tier 739c indicates a peak latency 751c between 230 ns and 240 ns. Tier 741c indicates a peak latency 751c between 240 ns and 250 ns. And tier 743c indicates a peak latency 751c of more than 250 ns. For the first Pareto point (8 KB, 300 MHz), field 710 indicates that in scenario 530-2, 37% of the peak latency 751c is within tier 737c. For the second Pareto point (4 KB, 500 MHz), field 710 indicates that in scenario 530-2, only 10% of the peak latency 751c is within tier 737c.

Further, SSA tool 100 provides a designer an indication that the second Pareto point (4 KB, 500 MHz) tends to increase the peak latency 751c of CPU 301-0. Further, there are instances when CPU 301-0 executes the background function without interference by CPU 301-1: about 20% for (8 KB, 300 MHz, cf. peak latency 739c), and 30% for (4 KB, 500 MHz, cf. peak latency 739c); this tendency does not change much for different scenarios 430.

FIG. 7D: Lists seven tiers of average latency 751d for the background application. In analogy with FIG. 7C: Tier 731d indicates an average latency 751d (in nanoseconds, ns) between 190 ns and 200 ns. Tier 733d indicates an average latency 751d between 200 ns and 210 ns. Tier 735d indicates an average latency 751d between 210 ns and 220 ns. Tier 737d indicates an average latency 751d between 220 ns and 230 ns. Tier 739d indicates an average latency 751d between 230 ns and 240 ns. Tier 741d indicates an average latency 751d between 240 ns and 250 ns. And tier 743d indicates an average latency 751d of more than 250 ns. For the first Pareto point (8 KB, 300 MHz), field 710 indicates that in scenario 530-2, 33% of average latency 751d is within tier 735d, while only 4% is within tier 737d. For the second Pareto point (4 KB, 500 MHz), field 710 indicates that in scenario 530-2, 16% of average latency 751d is within tier 735d, while only 5% of the average latency 751d is within tier 737d.

Therefore, SSA tool 100 indicates to the designer that for the first Pareto point (8 KB, 300 MHz), CPU 301-0 could complete virtually all executions of its function within 220 ns (e.g., according to field 710: 40%+14%+33%=87% on average, below 220 ns). For the second Pareto point (4 KB, 500 MHz), the latency of CPU 301-0 tends to be more spread out (e.g., 40%+9%+16%=65% on average, below 220 ns), influenced more sensitively by the activity of CPU 301-1.

Figure 8:
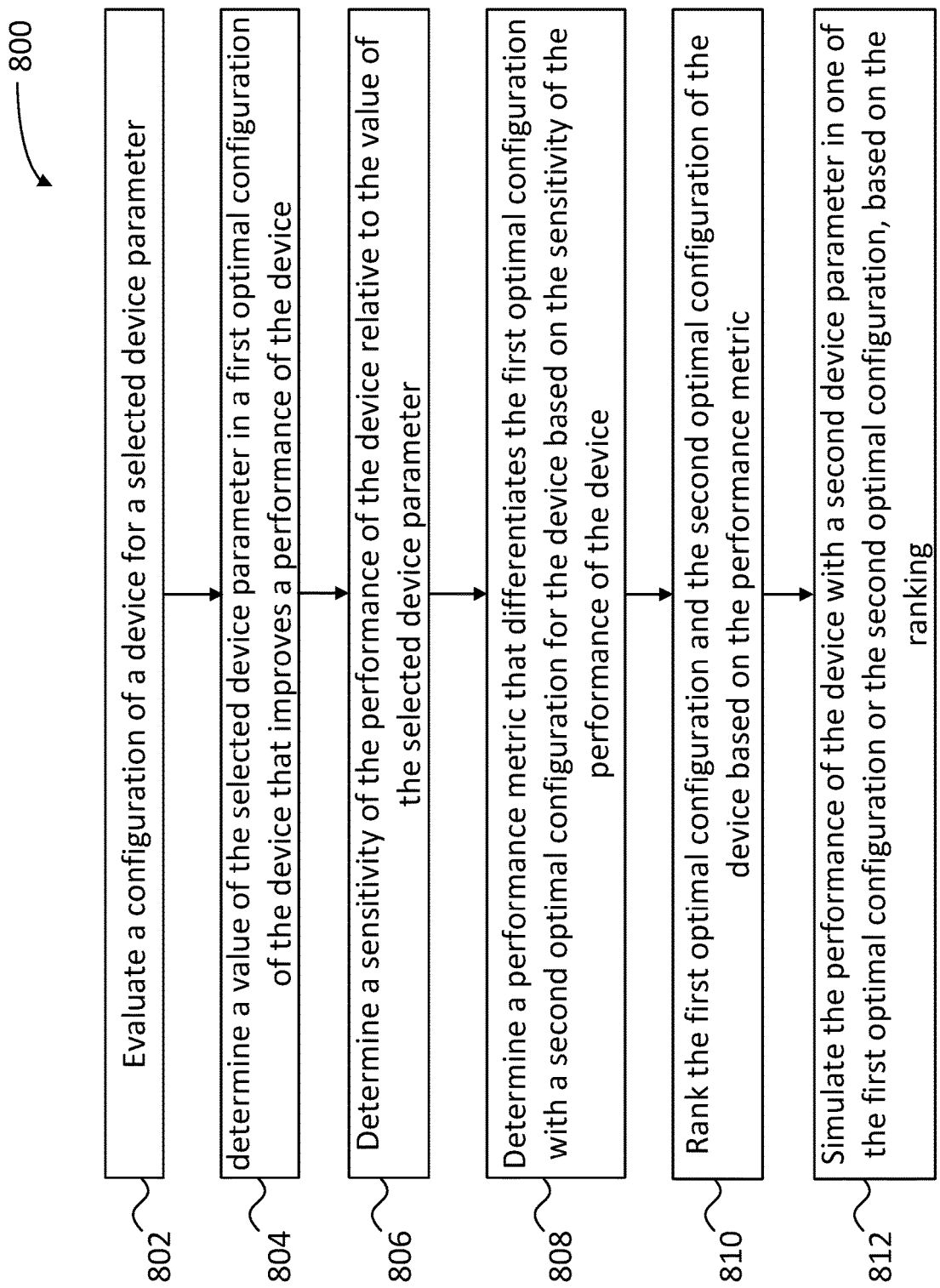
FIG. 8 is a flow chart illustrating steps in a method for evaluating multiple design architectures for a SoC, according to some embodiments.

FIG. 8 is a flow chart illustrating steps in a method 800 for evaluating multiple design architectures for a SoC (e.g., SoC 121, 221, or 321), according to some embodiments. At least some of the steps in method 800 may be performed by a computer having a processor executing commands stored in a memory of the computer (e.g., client host 102 or SSA tool 100, processors 12 or 36, and memories 20 or 30). In some embodiments, at least some of the commands may be stored as part of an SSA application installed in a computer (e.g., application 22 in client host 102). Further, steps as disclosed in method 800 may include retrieving, editing, and/or storing files in a database that is part of, or is communicably coupled to, the computer (e.g., system performance database 140). Methods consistent with the present disclosure may include at least some, but not all of the steps illustrated in method 800, performed in a different sequence. Furthermore, methods consistent with the present disclosure may include at least two or more steps as in method 800, performed overlapping in time, or almost simultaneously.

In some embodiments, at least one or more of the steps in method 800 may be performed in a cloud computing environment, wherein a computer may include servers, such as a master server and a slave server. Accordingly, at least some of the steps illustrated in method 800 may be performed in parallel in different processors, following separate computational threads. For example, each of the separate computational threads may be performed by at least one of slave servers in each of multiple applications and processors dedicated to the specific computational thread.

Step 802 includes evaluating a device configuration for a selected device parameter. In some embodiments, step 802 includes evaluating a design architecture for a selected parameter. In some embodiments, the device configuration includes a controllable property of a system on a chip and an environmental property of the system on a chip, and step 802 includes retrieving the device configuration from a system performance database. In some embodiments, the selected device parameter a logic command for a compiler, that provides an instruction to a system on a chip, and step 802 includes retrieving a result from the instruction to the system on a chip, the result stored in a system performance database. In some embodiments, step 802 includes executing multiple simulations of the device performance under multiple combinations of device parameter values including the value of the selected device parameter, and populating a system performance database with the device performance. In some embodiments, step 802 includes deselecting at least one device parameter from the device configuration based on the sensitivity of the device performance relative to the at least one device parameter. In some embodiments, step 802 includes evaluating a configuration for a selected rate of data injection to a system on a chip.

Step 804 includes determining a value of the selected device parameter in a first optimal configuration of the device that improves the performance of the device. In some embodiments, step 804 includes finding a value of the selected device parameter for a Pareto point. In some embodiments, step 804 includes finding a Pareto point for the selected parameter. In some embodiments, step 804 includes receiving a user selection of a pass and fail score for the value for an observable property, and displaying the value for the observable property according to the pass and fail score. In some embodiments, step 804 includes extracting performance metrics of interest from a system performance database for evaluating a configuration of the device with a selected device parameter.

Step 806 includes determining a sensitivity of the performance of the device relative to the value of the selected device parameter. In some embodiments, step 806 includes determining a combination of parameter values that does not affect the device performance. In some embodiments, step 806 includes determining a range of parameter values with a highly sensitive device performance. In some embodiments, step 806 includes selecting a device parameter for evaluating the device configuration based on the sensitivity of the device performance relative to a value of the device parameter.

Step 808 includes determining a performance metric (e.g., an observable property) that differentiates at least two otherwise optimal device configurations (e.g., the first optimal device configuration from a second optimal device configuration) based on the sensitivity of the performance of the device. In some embodiments, step 808 includes determining a parameter value that is a tie-breaker for other parameter values in the performance of the device.

Step 810 includes ranking the first optimal configuration and the second optimal configuration of the device based on the performance metric. In some embodiments, step 810 includes ranking multiple optimal configurations of the device based on a cost metric. In some embodiments, step 810 includes observing multiple cost metrics to rank optimal configurations of the device. In some embodiments, step 810 includes sorting a display of multiple optimal configurations of the device according to a desired value of the performance of the device.

Step 812 includes simulating the performance of the device with a second device parameter in one of the first optimal configuration or the second optimal configuration, based on the ranking. In some embodiments, step 812 includes identifying an area of a device parameter space to select the second device parameter based on the sensitivity of the performance of the device relative to the value of the selected parameter. In some embodiments, step 812 includes adding multiple simulations for configurations of the device from the identified area of the device parameter space (e.g., controllable properties and environmental properties). In some embodiments, step 812 may include identifying border areas in the device parameter space where the SoC performance is met (e.g., an observable property has a value within a selected constraint) near areas where the SoC performance is not met. In some embodiments, step 812 may also include identifying a selected area in the device parameter space with a high sensitivity of the SoC performance (e.g., where the SoC performance varies considerably between neighboring points in the area). Accordingly, step 812 includes determining more SoC simulations in the identified areas to add data to the database and perform a more accurate statistical analysis of the SoC.

Figure 9:
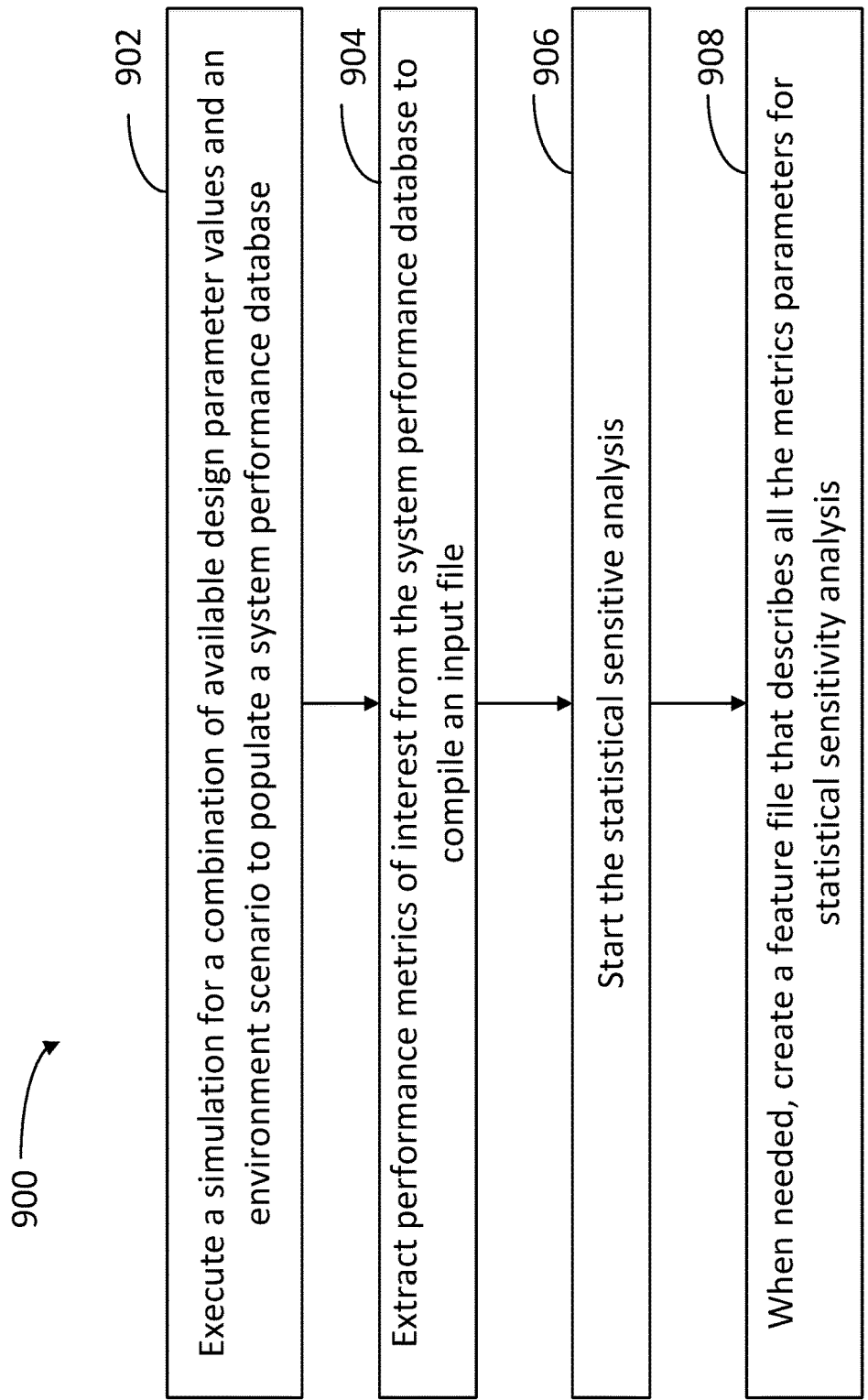
FIG. 9 is a flow chart illustrating steps in a method for evaluating a statistical sensitivity in a design architecture of a SoC, according to some embodiments.

FIG. 9 is a flow chart illustrating steps in a method 900 for evaluating a statistical sensitivity in a design architecture of a SoC, according to some embodiments (e.g., SoC 121, 221, or 321). At least some of the steps in method 900 may be performed by a computer having a processor executing commands stored in a memory of the computer (e.g., client host 102 or SSA tool 100, processors 12 or 36, and memories 20 or 30). In some embodiments, at least some of the commands may be stored as part of an SSA application installed in a computer (e.g., application 22 in client host 102). Further, steps as disclosed in method 900 may include retrieving, editing, and/or storing files in a database that is part of, or is communicably coupled to, the computer (e.g., system performance database 140). Methods consistent with the present disclosure may include at least some, but not all of the steps illustrated in method 900, performed in a different sequence. Furthermore, methods consistent with the present disclosure may include at least two or more steps as in method 900, performed overlapping in time, or almost simultaneously.

In some embodiments, at least one or more of the steps in method 900 may be performed in a cloud computing environment, wherein a computer may include servers, such as a master server and a slave server. Accordingly, at least some of the steps illustrated in method 900 may be performed in parallel in different processors, following separate computational threads. For example, each of the separate computational threads may be performed by at least one of slave servers in each of multiple applications and processors dedicated to the specific computational thread.

Step 902 includes executing one or more simulations for a combination of one or more available design parameter values and one or more environment scenarios, and populating the database. In some embodiments, step 902 may include executing a command such as:

$ cd platform_ssa

Assuming that a design for the SoC is under directory "./platform_ssa" (e.g., in memory 20 of client host 102) including a "project.tcl" file that describes multiple device configurations. Accordingly, step 902 may include accessing a setup file using a command as follows:

$source setup.csh

Step 902 may also include a command $ make sim_all_par BDW_JOBS=N

That simulates all device configurations from the file "project.tcl" on (at most) N parallel processes. In some embodiments, step 902 may include serial simulation of all device configurations from the file "project.tcl" with a "make sim_all" command.

In some embodiments, the results from the simulations in step 902 may be stored in the database, which is named "ssa.db" (for illustrative purposes only), using the command:

$ make ssa

Step 904 includes extracting performance metrics of interest from the database to compile an input file (e.g. with a ".dat" extension). In some embodiments, step 904 may include forming a CSV file "ssa.dat". Accordingly, step 904 may include launching the SSA application (from ./bin/ssa). Step 904 may include forming a reference ".dat" file in the package with a path ./platform_ssa/demo_ssa_input/demo.dat Step 906 includes starting the statistical sensitivity analysis. In some embodiments, step 906 may include selecting from the window of the SSA application in the client host computer the option "File→New." Further, step 906 may include selecting the option "ssa.dat"→"Open" to open the data file including the simulations results for the SoC. The SSA application may issue a prompt "Do you want to load the feature configuration?" In some embodiments, the user may reply "No," to create a new ".fea" file from scratch. Thereafter, the user may follow the GUI directions to proceed with the statistical sensitivity analysis.

Step 908 includes creating a "feature" file (e.g., with a ".fea" extension) that describes the metric parameters for statistical sensitivity analysis. A file "ssa.fea" is be generated in the local directory for future use. In some embodiments, the user may select "Open" when the ".fea" file is already available. A reference ".fea" file may be included in the package with a path ./platform_ssa/demo_ssa_input/demo.fea After clocking "No," follow the SSA application. In step 908, the user may check "Don't care" for any device parameter that should not be included in the analysis. In some embodiments, step 908 may also include marking the type of device parameter to be selected: a controllable property (e.g. FIFO, CPUCLK), an observable property (e.g. APP_LAT, PEAK_BW), or an environmental property (e.g. GenPeriod). Adjust the ordering of values (or mark feature as "Unordered"). In step 908, the SSA application may allow values in the text box can be moved up and down by "Select & Drag." In some embodiments, sorting the device parameter values may be desirable for the primary feasibility constraints, e.g.: Order APP_LAT from higher value (MORE) to lower (US_FROM_1_0_UPTO_2_0).

Figure 10:
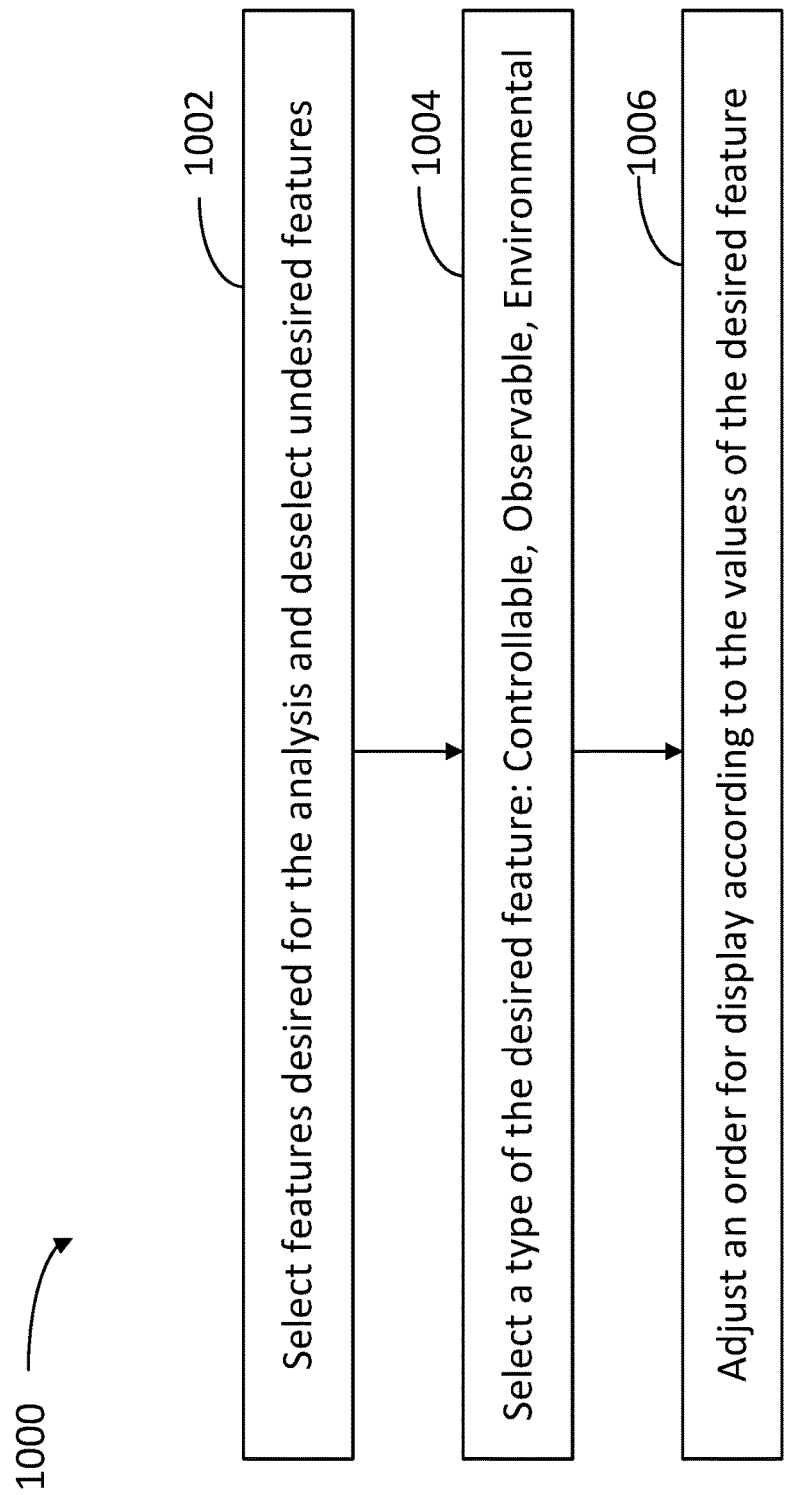
FIG. 10 is a flow chart illustrating steps in a method for determining metrics and parameters for features in a design architecture of a SoC, according to some embodiments.

FIG. 10 is a flow chart illustrating steps in a method 1000 for determining metrics and parameters for features in a design architecture of a SoC (e.g., SoC 121, 221, or 321), according to some embodiments. At least some of the steps in method 1000 may be performed by a computer having a processor executing commands stored in a memory of the computer (e.g., client host 102 or SSA tool 100, processors 12 or 36, and memories 20 or 30). In some embodiments, at least some of the commands may be stored as part of an SSA application installed in a computer (e.g., application 22 in client host 102). Further, steps as disclosed in method 1000 may include retrieving, editing, and/or storing files in a database that is part of, or is communicably coupled to, the computer. Methods consistent with the present disclosure may include at least some, but not all of the steps illustrated in method 1000, performed in a different sequence. Furthermore, methods consistent with the present disclosure may include at least two or more steps as in method 1000, performed overlapping in time, or almost simultaneously.

In some embodiments, at least one or more of the steps in method 1000 may be performed in a cloud computing environment, wherein a computer may include servers, such as a master server and a slave server. Accordingly, at least some of the steps illustrated in method 1000 may be performed in parallel in different processors, following separate computational threads. For example, each of the separate computational threads may be performed by at least one of slave servers in each of multiple applications and processors dedicated to the specific computational thread.

Step 1002 includes selecting features desired for the analysis and deselecting undesired features. The features in step 1002 may include properties of the SoC that the designer may be interested on testing, as disclosed herein. For example, a buffer size, a clock speed, a bandwidth for a bus socket and the like.

Step 1004 includes selecting a type of the desired feature. In some embodiments, step 1004 includes selecting one of a controllable, observable, or environmental properties, as disclosed herein. Controllable property: a depth of a FIFO buffer (e.g. for a memory in the SoC). Observable property: a peak bandwidth of the memory socket on the bus. Environmental property: injection traffic rate, such as a camera frame rate for an SoC that controls a digital video camera. Another example of environmental properties may be the user selectable settings for the operating mode of an appliance or device (e.g., a smart phone, a camera, and the like) that includes the SoC. For example, an environmental property may include a user selection of picture resolution for an SoC in a digital camera, or a video frame rate selection for an SoC in a video camera (e.g., for surveillance video, or high definition video, and the like).

Step 1006 includes adjusting an order for display according to the values of the desired feature.

Figure 11:
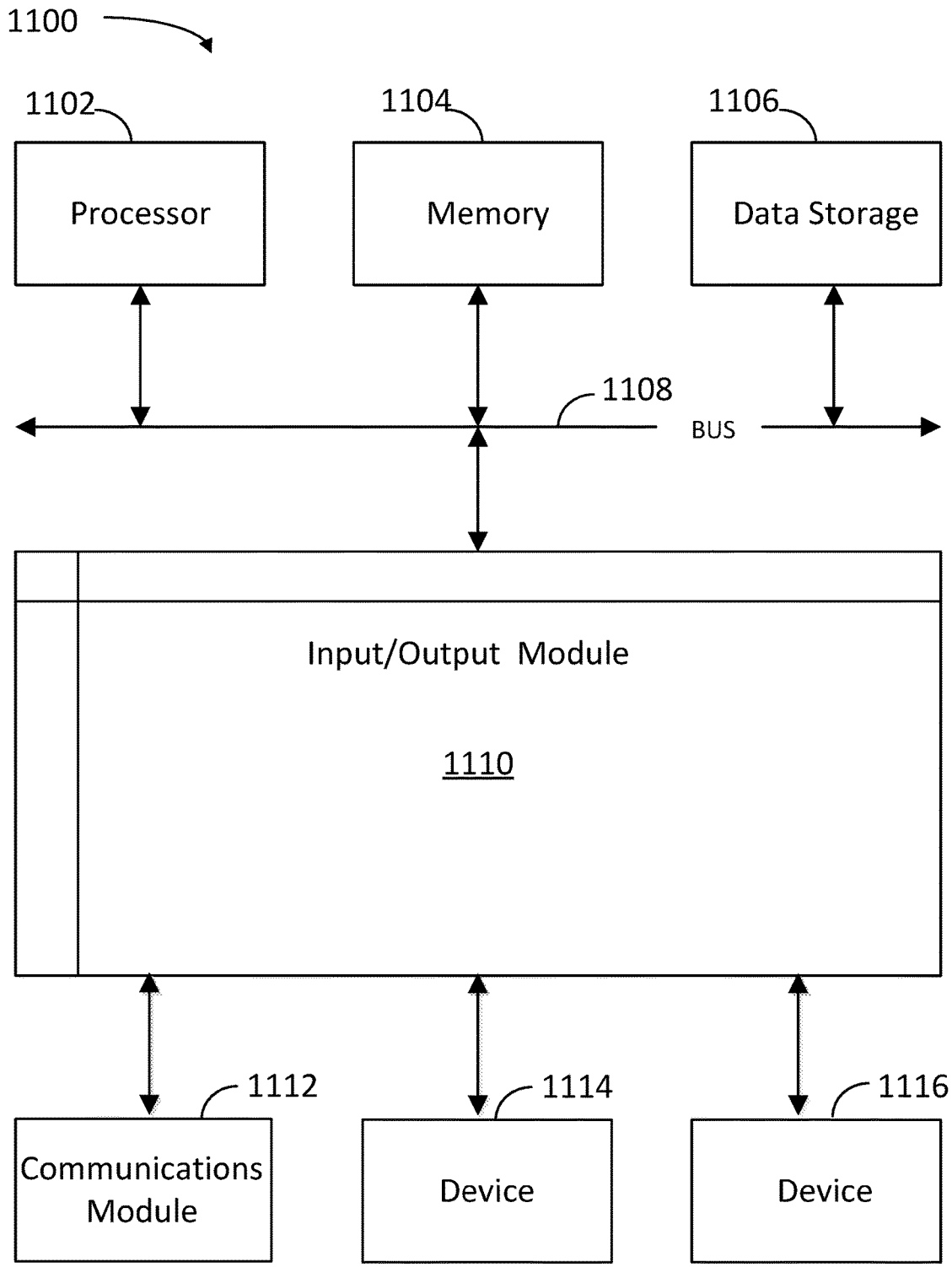
FIG. 11 is a block diagram illustrating an example computer system for, according to some embodiments.

FIG. 11 is a block diagram illustrating an example computer system 1100 with which the methods and steps illustrated in methods 800-1000 can be implemented, according to some embodiments. In certain aspects, computer system 1100 can be implemented using hardware or a combination of software and hardware, either in a dedicated server, integrated into another entity, or distributed across multiple entities.

Computer system 1100 includes a bus 1108 or other communication mechanism for communicating information, and a processor 1102 coupled with bus 1108 for processing information. By way of example, computer system 1100 can be implemented with one or more processors 1102. Processor 1102 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1102 may include modules and circuits configured as a 'placing' tool or engine, or a 'routing' tool or engine, to place devices and route channels in a circuit layout, respectively and as disclosed herein.

Computer system 1100 includes, in addition to hardware, code that creates an execution environment for the computer program in question, e.g., code that constitutes processor firmware, a protocol stack, a database management system, an operating system, or a combination of one or more of them stored in an included memory 1104, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. Processor 1102 and memory 1104 can be supplemented by, or incorporated in, special purpose logic circuitry.

The instructions may be stored in memory 1104 and implemented in one or more computer program products, i.e., one or more modules of computer program instructions encoded on a computer readable medium for execution by, or to control the operation of, the computer system 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 604 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled to bus 1108 for storing information and instructions.

Computer system 1100 is coupled via input/output module 1110 to various devices. The input/output module 1110 is any input/output module. Example input/output modules 1110 include data ports such as USB ports. The input/output module 1110 is configured to connect to a communications module 1112. Example communications modules 1112 include networking interface cards, such as Ethernet cards and modems. In certain aspects, the input/output module 1110 is configured to connect to a plurality of devices, such as an input device 1114 and/or an output device 1116. Example input devices 1114 include a keyboard and a pointing device, e.g., a mouse or a trackball, by which a user can provide input to the computer system 1100. Other kinds of input devices 1114 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1116 include display devices, such as a LED (light emitting diode), CRT (cathode ray tube), or LCD (liquid crystal display) screen, for displaying information to the user.

Methods as disclosed herein may be performed by computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein (e.g., as in methods 800-1000). One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 1100 includes servers and personal computer devices. A personal computing device and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1102 for execution. Such a medium may take many forms, including, but not limited to, non-volatile media, volatile media, and transmission media. Non-volatile media include, for example, optical disks, magnetic disks, or flash memory, such as data storage device 1106. Volatile media include dynamic memory, such as memory 1104. Transmission media include coaxial cables, copper wire, and fiber optics, including the wires that comprise bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
evaluating a configuration of a device for a selected design parameter,
wherein the device includes a system on a chip and configuration of the device comprises a controllable property of the system on a chip and an environmental property of the system on a chip;
determining a value of the selected design parameter in a first optimal configuration of the device that improves a performance of the device;
determining a sensitivity of the performance of the device relative to the value of the selected design parameter;
determining a performance metric that differentiates the first optimal configuration with a second optimal configuration for the device based on the sensitivity of the performance of the device;
ranking the first optimal configuration and the second optimal configuration of the device based on the performance metric; and
simulating the performance of the device with a second design parameter in one of the first optimal configuration or the second optimal configuration, based on the ranking.

2. The computer-implemented method of claim 1, wherein evaluating the configuration of the device comprises retrieving the configuration of the device from a system performance database.

3. The computer-implemented method of claim 1, wherein:
the selected design parameter comprises a logic command for a compiler,
the compiler provides an instruction to the system on a chip, and
evaluating the configuration of the device comprises retrieving a result from the instruction to the system on a chip, the result stored in a system performance database.

4. The computer-implemented method of claim 1, wherein evaluating a configuration of a device for a selected design parameter comprises executing multiple simulations of the performance of the device under multiple combinations of design parameter values including the value of the selected design parameter, and populating a system performance database with the performance of the device.

5. The computer-implemented method of claim 1, wherein evaluating a configuration of a device for a selected design parameter comprises deselecting at least one design parameter from the configuration of the device based on the sensitivity of the performance of the device relative to the at least one device parameter.

6. The computer-implemented method of claim 1, wherein evaluating the configuration of the device comprises evaluating a configuration for a selected rate of data injection to the system on a chip.

7. The computer-implemented method of claim 1, further comprising receiving a user selection of a pass and fail score for the value for an observable property of the device, and displaying the value for the observable property of the device according to the pass and fail score.

8. The computer-implemented method of claim 1, further comprising extracting a performance metric of interest from a system performance database for evaluating the configuration of the device.

9. The computer-implemented method of claim 1, further comprising selecting a design parameter for evaluating the configuration of the device based on the sensitivity of the performance of the device relative to a value of the design parameter.

10. The computer-implemented method of claim 1, further comprising sorting a display of multiple optimal configurations of the device according to a desired value of the performance of the device.

11. A system, comprising:
a memory, storing instructions; and
at least one processor that executes the instructions to:
evaluate a configuration of a device for a selected design parameter,
wherein the device includes a system on a chip and configuration of the device comprises a controllable property of the system on a chip and an environmental property of the system on a chip;
determine a value of the selected design parameter in a first optimal configuration of the device that improves a performance of the device;
determine a sensitivity of the performance of the device relative to the value of the selected design parameter;
determine a performance metric that differentiates the first optimal configuration with a second optimal configuration for the device based on the sensitivity of the performance of the device;
determine a rank of the first optimal configuration and the second optimal configuration of the device based on the performance metric; and
simulate the performance of the device with a second design parameter in one of the first optimal configuration or the second optimal configuration, based on the rank.

12. The system of claim 11, wherein, to evaluate the configuration of the device, the at least one processor executes instructions to retrieve the configuration of the device from a system performance database.

13. The system of claim 11, wherein:
the selected design parameter comprises a logic command for a compiler,
the compiler provides an instruction to the system on a chip, and
to evaluate the configuration of the device the at least one processor executes instructions to retrieve a result from the instruction to the system on a chip, the result stored in a system performance database.

14. The system of claim 11, wherein to evaluate the configuration of the device for a selected design parameter the at least one processor executes multiple simulations of the performance of the device under multiple combinations of design parameter values including the value of the selected design parameter, and populating a system performance database with the performance of the device.

15. The system of claim 11, wherein to evaluate the configuration of the device for a selected design parameter the at least one processor executes instructions to deselect at least one design parameter from the configuration of the device based on the sensitivity of the performance of the device relative to the at least one design parameter.

16. The system of claim 11, wherein the at least one processor further executes instructions to sort a display of multiple optimal configurations of the device according to a desired value of the performance of the device.

17. The system of claim 11, wherein the at least one processor further executes instructions to receive a user selection of a pass and fail score for the value for an observable property of the device, and displaying the value for the observable property of the device according to the pass and fail score.

18. A non-transitory, computer-readable medium comprising instructions stored in a memory which, when executed by a processor cause a computer to perform a method, the method comprising:
    evaluating a configuration of a device for a selected design parameter,
        wherein the device includes a system on a chip and configuration of the device comprises a controllable property of the system on a chip and an environmental property of the system on a chip;
    determining a value of the selected design parameter in a first optimal configuration of the device that improves a performance of the device;
    determining a sensitivity of the performance of the device relative to the value of the selected design parameter;
    determining a performance metric that differentiates the first optimal configuration with a second optimal configuration for the device based on the sensitivity of the performance of the device;
    ranking the first optimal configuration and the second optimal configuration of the device based on the performance metric; and
    simulating the performance of the device with a second design parameter in one of the first optimal configuration or the second optimal configuration, based on the ranking.

19. The non-transitory, computer-readable medium of claim 18, wherein evaluating the configuration of the device comprises retrieving the configuration of the device from a system performance database.

20. The non-transitory, computer-readable medium of claim 18, wherein:
    the selected design parameter comprises a logic command for a compiler,
    the compiler provides an instruction to the system on a chip, and
    evaluating the configuration of the device comprises retrieving a result from the instruction to the system on a chip, the result stored in a system performance database.

* * * * *